United States Patent
Mihaly et al.

(10) Patent No.: US 8,009,582 B2
(45) Date of Patent: Aug. 30, 2011

(54) METHOD AND APPARATUS FOR PERFORMANCE MONITORING IN A COMMUNICATIONS NETWORK

(75) Inventors: Attila Mihaly, Dunakeszi (HU); Janos Harmatos, Budapest (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 127 days.

(21) Appl. No.: 12/532,990

(22) PCT Filed: Mar. 26, 2007

(86) PCT No.: PCT/EP2007/002656
§ 371 (c)(1),
(2), (4) Date: Nov. 19, 2009

(87) PCT Pub. No.: WO2008/116482
PCT Pub. Date: Oct. 2, 2008

(65) Prior Publication Data
US 2010/0110918 A1 May 6, 2010

(51) Int. Cl.
*H04L 12/26* (2006.01)
(52) U.S. Cl. ........................ 370/252; 370/232
(58) Field of Classification Search .................. 370/232, 370/229, 412, 349, 401; 709/207, 224
See application file for complete search history.

(56) References Cited

U.S. PATENT DOCUMENTS

| | | | |
|---|---|---|---|
| 6,574,213 B1* | 6/2003 | Anandakumar et al. | 370/349 |
| 7,773,517 B2* | 8/2010 | Abdel-Kader et al. | 370/232 |
| 7,773,611 B2* | 8/2010 | Booth et al. | 370/401 |
| 2004/0148546 A1* | 7/2004 | Meyer et al. | 714/18 |
| 2006/0075093 A1* | 4/2006 | Frattura et al. | 709/224 |
| 2007/0230493 A1* | 10/2007 | Dravida et al. | 370/412 |
| 2008/0037420 A1* | 2/2008 | Tang | 370/229 |
| 2008/0045185 A1* | 2/2008 | Lee et al. | 455/412.2 |
| 2008/0253314 A1* | 10/2008 | Stephenson et al. | 370/326 |
| 2009/0055501 A1* | 2/2009 | Wang et al. | 709/207 |

OTHER PUBLICATIONS

Division of Information Technology: "Windows—DOS Commands" University of Wisconsin Help Desk Knowledgebase. Jan. 1, 2005, pp. 1-13 XP00244672.

* cited by examiner

*Primary Examiner* — Thong Vu

(57) ABSTRACT

A method and device for determining a packet drop indicator, for use in a communication system is described. The method comprises the following steps: A. determining the number of packets sent at a sending side within a first time period; B. determining the number of packets received at a receiving side within a second time period; and C. calculating a packet drop indicator on the basis of said number of sent packets and said number of received packets.

33 Claims, 17 Drawing Sheets

METHOD AND APPARATUS FOR PERFORMANCE MONITORING IN A COMMUNICATIONS NETWORK

The present invention relates to methods, apparatus, storage media storing computer program instructions and signals carrying computer program instructions, for monitoring packet delivery performance. It relates, for example, to determining a packet drop indicator (PDI) for a path within a communications network. The present invention is applicable to monitoring packet delivery, for example for real-time applications and in IP (Internet Protocol) networks.

BACKGROUND

In traditional IP-oriented networks, there are no Quality of Service (QoS) guarantees. This is because traditional internet applications like email or web browsing do not require real-time delivery of packets. The development of IP-based high-demanding real-time applications like IP telephony and multimedia conferencing has lead to the evolution of QoS on the IP networks. In the future, it is expected that Internet Service Providers (ISP) will provide value-added services on their networks to satisfy customer needs. The customers may range from individual users to big telecom service providers or other ISPs.

Monitoring is required for example to maintain and verify contracted packet delivery performance. Conventional techniques for monitoring packet delivery performance include active monitoring, passive monitoring, passive combined monitoring and marking.

The main characteristic of passive (static) monitoring is that it does not change anything in the network traffic but records simple metrics and statistics. Passive monitoring is generally based on Simple Network Management Protocol (SNMP), as described in "A Simple Network Management Protocol (SNMP)", RFC 1157. Passive monitoring based on SNMP configures and polls Management Information Base (MIB) variables, as described in "Remote Network Monitoring Management Information Base" RFC 2819, in the network elements.

An extension of passive monitoring is when the information collected from multiple points is combined to obtain more complex parameters like available bandwidth or edge-to-edge average drop statistics on a path.

Active probing, or traffic injection, is a group that contains monitoring systems with traffic injecting, processing and replying functionalities. Active-type monitoring actually injects artificial or test traffic into the network. In other words, active monitoring is based on measurements of probe packets injected into the network.

Marking, or packet modification, is a group that includes monitoring systems with packet marking and processing functionalities. This is an active type of monitoring because the marking points modify existing traffic, but it does not generate artificial traffic in the network. Marking-based monitoring systems are able to measure flow-level performance statistics like edge-to-edge average delay, delay variation, packet loss ratios etc.

Conventional monitoring solutions such as those described above are not well suited to modern networks in which it is required to check that packet delivery according to a contracted QoS guarantee is being delivered by the service provider. For example, it is difficult to determine a packet loss indicator over a wide range of time-scales using such techniques.

SUMMARY

According to a first aspect of the present invention, there is provided a method of determining a packet drop indicator, for use in a communication system comprising a sending side and a receiving side, comprising the following steps: A. determining the number of packets sent at the sending side within a first time period; B. determining the number of packets received at the receiving side within a second time period; and C. calculating a packet drop indicator on the basis of said number of sent packets and said number of received packets.

There is further provided a method, wherein said step C is performed at said sending side, said determining of step A comprises counting the number of sent packets, and said determining of step B comprises receiving an indication of the number of packets received at said receiving side.

There is further provided a method, wherein said step C is performed at said receiving side, said determining of step A comprises receiving an indication of the number of packets sent by said sending side, and said determining of step B comprises counting the number of received packets.

There is further provided a method, wherein said step C is performed at a management unit, said determining of step A comprises receiving an indication of the number of packets sent by said sending side, and said determining of step B comprises receiving an indication of the number of packets received at said receiving side.

There is further provided a method, wherein said sending side sends a sending side information message to said receiving side, said sending side information message comprising an indication of the number of packets sent within said first time period.

There is further provided a method, comprising performing said steps A to C for a plurality of said first time periods and a plurality of corresponding second time periods.

There is further provided a method, wherein each of said sending side information messages comprises an indication of the number of packets sent within a particular one of said first time periods, and an indication identifying said particular one of said first time periods.

There is further provided a method, wherein said receiving side sends a receiving side information message to said sending side, said receiving side information message comprising an indication of the number of packets received within said second time period.

There is further provided a method, comprising performing said steps A to C for a plurality of said second time periods and a plurality of corresponding first time periods.

There is further provided a method, wherein each of said receiving side information messages comprises an indication of the number of packets received within a particular one of said second time periods, and an indication identifying said particular one of said second time periods.

There is further provided a method, further comprising the steps of: sending from said sending side to said receiving side a plurality of successive trigger messages; and detecting at said receiving side receipt of successive trigger messages, wherein said first time period is associated with the sending of two successive trigger messages, and the second time period is associated with the receipt of two successive trigger messages.

There is further provided a method, wherein one of said trigger messages comprises a count value indicating the number of packets sent within said first time period.

There is further provided a method, further comprising the steps of: sending from said receiving side to said sending side a plurality of successive trigger messages; and detecting at said sending side receipt of successive trigger messages, wherein said first time period is associated with the receipt of two successive trigger messages, and the second time period is associated with the sending of two successive trigger messages.

There is further provided a method, wherein one of said trigger messages comprises a count value indicating the number of packets received within said second time period.

There is further provided a method, wherein said trigger messages are sent at regular intervals.

There is further provided a method, wherein the first time period is determined on the basis of clock signals internal to the sending side, and the second time period is determined on the basis of clock signals internal to the receiving side.

There is further provided a method, wherein the packet drop indicator is a packet loss ratio PLR defined as PLR=1−PCK(r)/PCK(s), wherein PCK(s) and PCK(r) are the count values of sent and received packets, respectively.

According to a second aspect of the present invention, there is provided a method of reporting a number of packets, comprising performing at one side of a communication system comprising a sending side and a receiving side the following steps: A. counting a number of packets sent or received within a time period; and B. reporting the counted value to the other side.

There is further provided a method, wherein said time period is determined by the sending of successive trigger messages.

There is further provided a method, wherein said time period is determined by detection of receipt of successive trigger messages.

According to a third aspect of the present invention, there is provided a storage medium storing computer program instructions to program a programmable processing apparatus to become operable to perform any of the above methods.

According to a fourth aspect of the present invention, there is provided a signal carrying computer program instructions to program a programmable processing apparatus to become operable to perform the method of any of the above methods.

According to a fifth aspect of the present invention, there is provided a control device for a sending side of a communication system comprising said sending side and a receiving side, comprising: a counter for counting a number of packets sent at the sending side within a predetermined time period, and a count value handler for handling a count value determined by said counter in a procedure for determining a packet drop indicator.

There is further provided a control device, wherein said count value handler comprises a count value reporter for sending said count value to one or both of the receiving side and a management unit.

There is further provided a control device, wherein said count value handler comprises a count value receiver for receiving a further count value from said receiving side, and a determiner for determining a said packet drop indicator on the basis of said count value output by said counter and said further count value received from said receiving side.

There is further provided a control device, further comprising a trigger message response element for determining said time period on the basis of trigger messages sent successively by said sending side.

There is further provided a control device, further comprising a trigger message response element for determining said time period on the basis of trigger messages received successively by said sending side.

There is further provided a control device, provided within a communication apparatus of said sending side.

There is further provided a control device, provided within a monitoring agent associated with said sending side.

There is further provided a control device, wherein said sending side comprises an ingress node of a communication network.

According to a sixth aspect of the present invention, there is provided a control device for a receiving side of a communication system comprising a sending side and said receiving side, comprising: a counter for counting a number of packets received at the receiving side within a predetermined time period, and a count value handler for handling a count value determined by said counter in a procedure for determining a packet drop indicator.

There is further provided a control device, wherein said count value handler comprises a count value reporter for sending said count value to one or both of the sending side and a management unit.

There is further provided a control device, wherein said count value handler comprises a count value receiver for receiving a further count value from said sending side, and a determiner for determining a said packet drop indicator on the basis of said count value output by said counter and said further count value received from said sending side.

There is further provided a control device, further comprising a trigger message response element for determining said time period on the basis of trigger messages received successively by said receiving side.

There is further provided a control device, further comprising a trigger message response element for determining said time period on the basis of trigger messages sent successively by said receiving side.

There is further provided a control device, provided within a communication apparatus of said receiving side.

There is further provided a control device, provided within a monitoring agent associated with said receiving side.

There is further provided a control device, wherein said receiving side comprises an egress node of a communication network.

There is further provided a control device, wherein said communication system is at least part of an Internet Protocol network with a Differentiated Services architecture.

According to a seventh aspect of the present invention, there is provided a communication system comprising a transmission path, a communication apparatus and a control device of the fifth aspect arranged at a sending side, and a communication apparatus and a control device of the sixth aspect arranged at a receiving side.

It is an object of the present application to provide improved methods and devices for packet transmission monitoring in a generalized system in which packets are sent from a sending side to a receiving side.

This object is achieved by the subject-matter of the independent claims. Advantageous embodiments are described in the dependent claims.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION

In all apparatus drawings of the present specification, the units and interconnections shown are notional, and are shown for illustration purposes only to assist understanding; they do not necessarily represent units and connections into which hardware is actually configured.

Example embodiments of the present invention are described below. These embodiments provide methods, devices, monitoring agents, systems, storage media storing computer program instructions and signals carrying computer program instructions for monitoring packet delivery performance.

Figure 1:
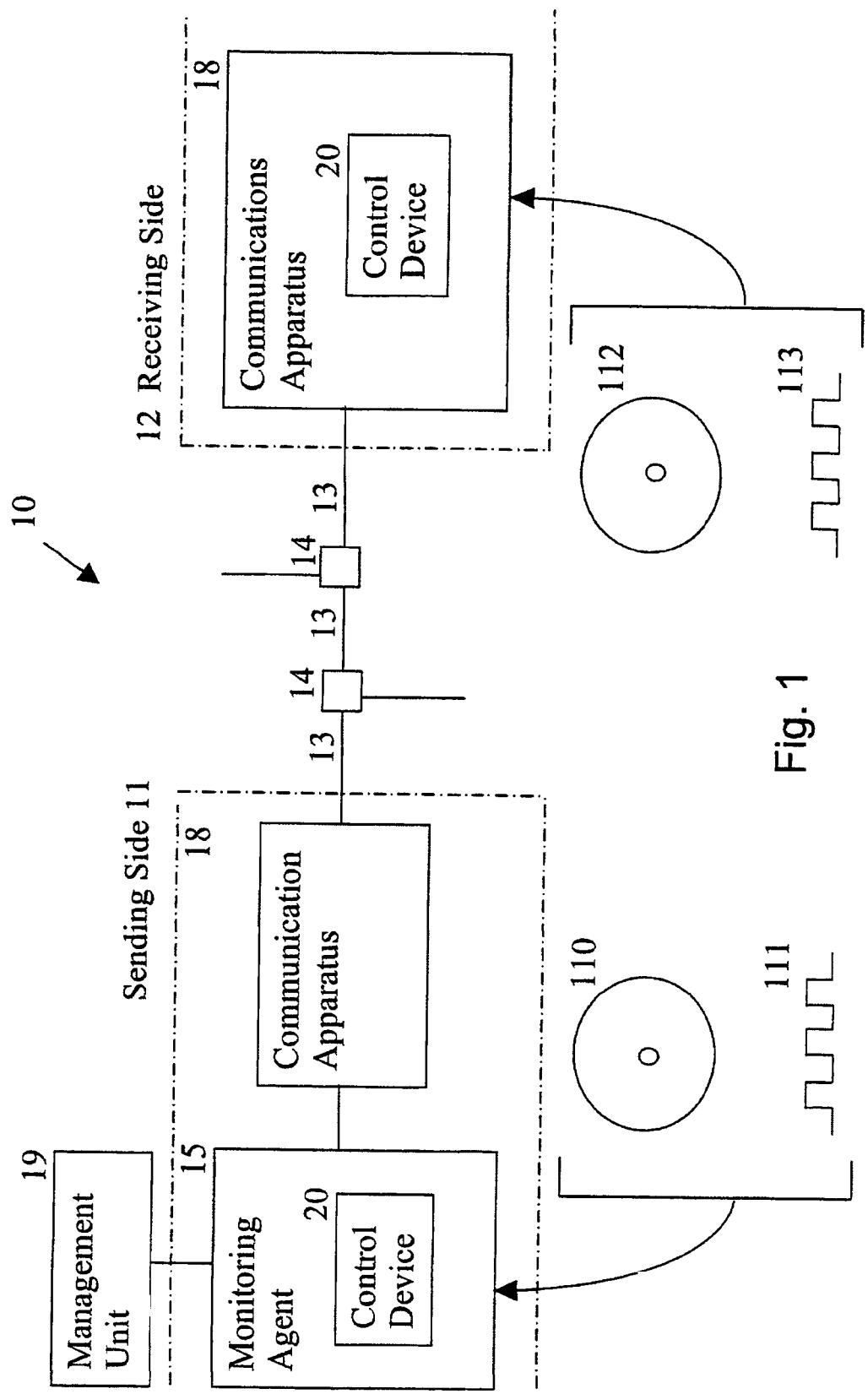
FIG. 1 shows a system comprising a transmission path between two communication apparatuses each associated with a control device.

FIG. 1 shows schematically an embodiment in the form of a communication system 10. The system comprises a sending side 11 and a receiving side 12 that communicate packets via a transmission path. Each side comprises a communication apparatus 18 that sends and/or receives packets, is directly connected to the path and is associated with and optionally comprises a control device such as that shown in FIG. 2 and described below. A transmission path may comprise one transmission link 13, such as an optical cable or a wireless radio frequency link, or a plurality of transmission links 13 separated by intermediate network nodes 14 such as routers, as shown in FIG. 1. The network may further comprise a management unit 19 for managing, for example, a control device 20, a path with associated control devices 20 and communication apparatuses 18, or a more extensive whole or part of a network.

Packets sent from the sending side 11 to the receiving side 12 of the communication system 10 may be any data unit and may contain e.g. user- or application-specific data such as voice or multimedia data. Therefore, the term "packet" is used in the present description and claims in a generic way, and describes any subdivision of data in an overall stream. Such packets can have different names in connection with different protocols and technologies, such as frames, data units, protocol data units, service data units, cells, blocks etc. Packets may be e.g. of standardised format such as, for example, those transmitted in packet-switched telecommunication networks including IP networks using e.g. Hypertext Transfer Protocol (HTTP), Simple Mail Transfer Protocol (SMTP) or File Transfer Protocol (FTP).

A system embodiment may be a part or a whole of a network such as an Internet Protocol network. Furthermore, the system may have an architecture such as an Integrated Services architecture or a Differentiated Services (DiffServ) architecture, which are two different architectures that have resulted from efforts to enable end-to-end QoS over IP networks. The DiffServ model is e.g. described in S. Blake et al.: An Architecture for Differentiated Services, RFC 2475. The DiffServ architecture defines three different main classes of traffic (Expedited Forwarding, Assured Forwarding and Best Effort) to offer QoS differentiation for traffic aggregates over a router hop. Consistent treatment of the same packet flow is then prescribed over the whole DiffServ domain.

Differentiated services are extended across a DiffServ domain boundary by establishing a Service Level Agreement (SLA) between an upstream network and a downstream domain. The SLA may specify packet classification and re-marking rules and may also specify traffic profiles and actions to traffic streams, which are in- or out-of-profile. In case of high quality services with real-time requirements, the SLA should also specify the required transmission QoS in terms of packet loss (e.g. low), and delay (e.g. low) across the neighbouring domain.

Naturally, these are only examples, and the concepts of the present application can be used in connection with any communication system in which data packets are sent from a sending side to a receiving side.

Using a system embodiment, packet delivery performance may be monitored even with limited access rights to a network. For example, only one communication apparatus such as an ingress router/agent comprising a control device of the present invention may be accessible or configurable by a management unit 19. Monitoring with limited access rights is especially useful when the network spans a large geographical distance and, for practical reasons, is divided into a plurality of management regions.

It is to be noted that the term "management unit" is used in the present description and claims in a generic way, and describes any apparatus for managing at least performance monitoring. This may be, for example, a dedicated, self-contained performance monitoring management unit or a management system distributed amongst a plurality of networked processing units. Therefore, the terms "management unit" and "management system" are used interchangeably in the present description, claims and drawings.

Figure 2:
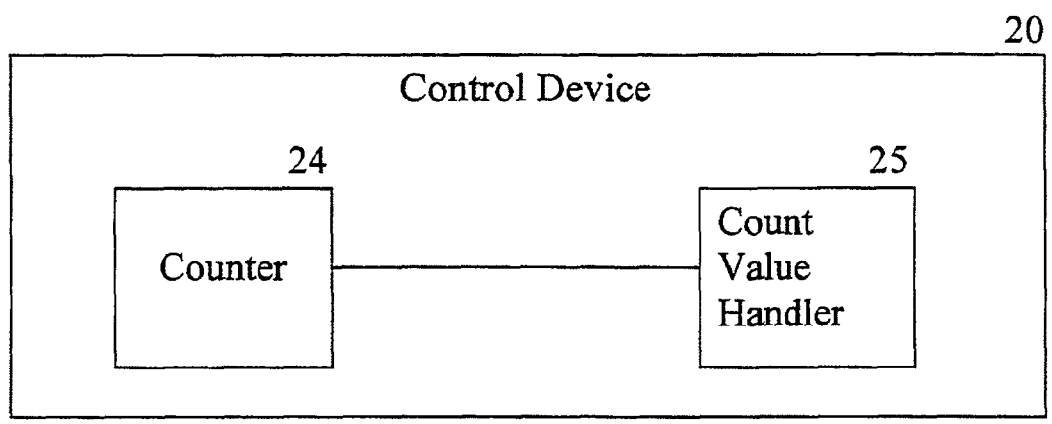
FIG. 2 shows a control device.

An embodiment in the form of a control device 20 referred to above in relation to FIG. 1 is shown in FIG. 2. The control device 20 is for the sending side 11 or receiving side 12 and comprises a counter 24 and a count value handler 25. The counter 24 counts packets sent or received by the communication apparatus 18 during a time period T1, T2. The time period may be determined, for example, by a clock signal internal to the control device or received from a management unit 19 or by trigger messages sent to or received from another network unit, and may be fixed or programmable. The count value handler 25 uses the value counted by the counter 24 in a procedure for determining a Packet Drop Indicator (PDI). For example, in such a procedure, the handler 25 may determine a PDI on the basis of a value received from the counter 24 and a count value received from another device on the network by a count value receiver 42, or may send a value received from the counter 24 to one or more further apparatuses (e.g. an opposite side 11, 12 or a management unit 19) where it is used for determining a PDI. Since the hardware requirements represented by the counter 24 and count value handler 25 require minimum circuitry for implementing a packet delivery monitoring function, an embodiment can be made very small-scale and hardware efficient and so may provide a lightweight packet delivery monitor apparatus.

Figure 3:
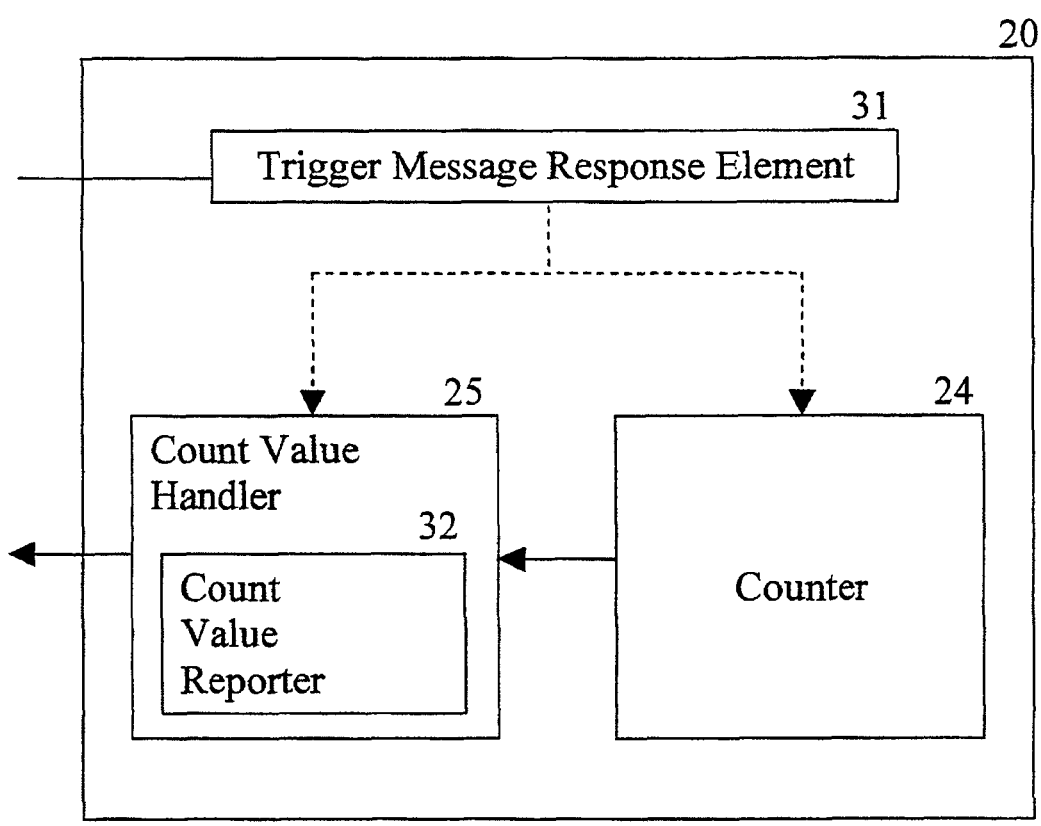
FIG. 3 shows a control device comprising a counter and a count value reporter both synchronised by a trigger message response element.

A more detailed control device embodiment 20 for a sending side or a receiving side is shown in FIG. 3 and comprises the units that are shown in and are operable as described above in relation to FIG. 2. In addition, it comprises a trigger message response element 31 for timing, and a count value reporter 32 within the count value handler 25. The trigger message response element 31 communicates (sends or receives) trigger messages to/from the opposite side. The counter 24 counts packets sent or received by an associated communication apparatus 18 during a time period determined by the communication of trigger messages. Such a period may extend from communication of one trigger message until communication of a further trigger message. Successive periods may result from repeated communication of trigger messages. The count value reporter 32 reports the final count value of the/each period as counted by the counter 24 to the opposite side 11, 12 or to a management unit 19 (in other words, wherever the respective PDI determination is to be performed).

Figure 4:
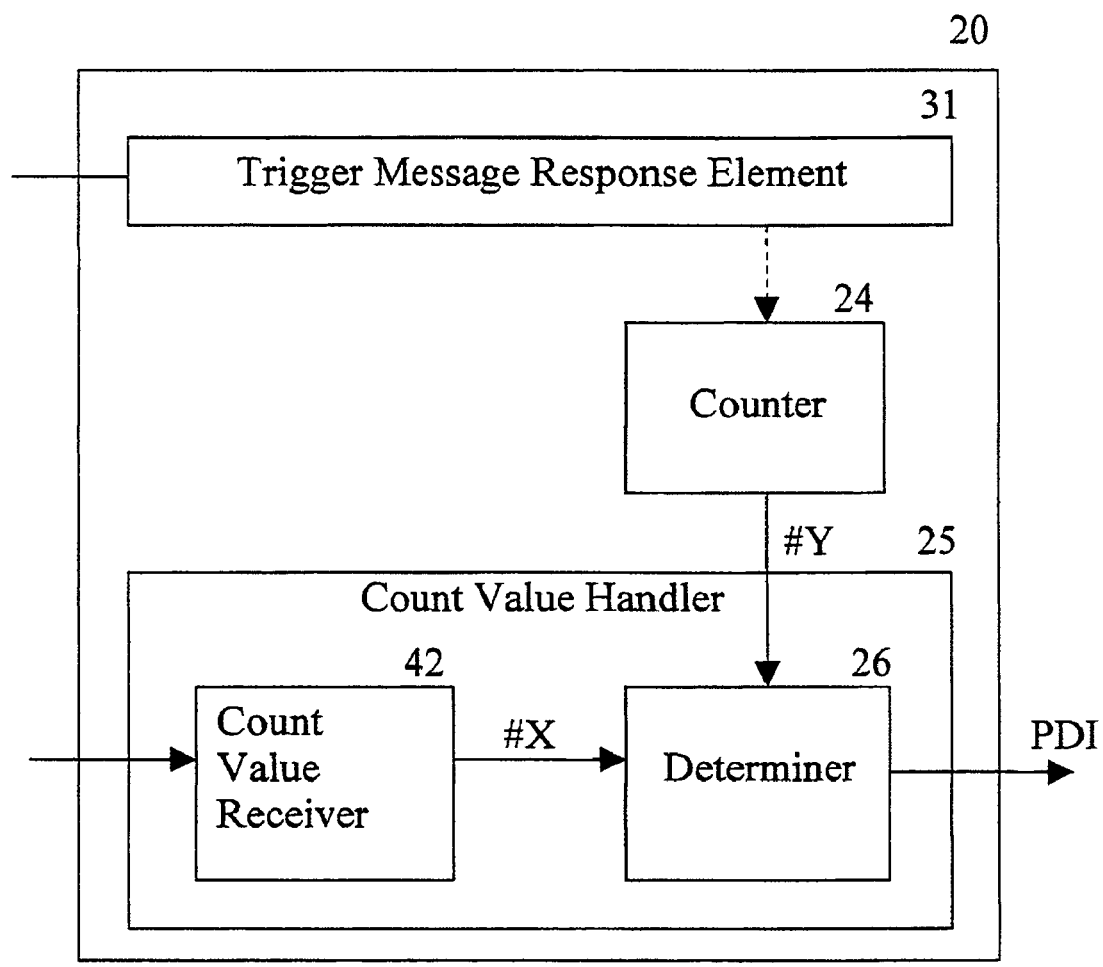
FIG. 4 shows a control device comprising a counter synchronised by a trigger message response element, and a determiner that receives the counter value and a value from a transmission path.

The control device embodiment 20 of FIG. 4 comprises the units that are shown in and are operable as described above in relation to FIG. 2. In addition, it comprises a trigger message response element 31 for timing, a count value receiver 42 and a determiner 26. The latter two units are comprised within the count value handler 25. The trigger message response element 31 communicates (sends or receives) trigger messages in the same manner as the trigger message response element 31 of FIG. 3. The count value receiver 42 receives a count value from an opposite side or from an additional network unit. The determiner 26 is arranged to determine a PDI on the basis of the count value received by the count value receiver 42 and the value counted in counter 24. or example, the determiner 26 may be a value comparator or a numeric calculator for dividing or subtracting the two values, so determining a numeric or Boolean indicator.

An alternative control device embodiment comprises the units 31, 42, 26, 25, 24 of FIG. 4, and the count value reporter 32 of FIG. 3. Such a control device embodiment, when installed on both sides 11,12' of a transmission path, may allow determination on each side of a PDI for the same direction of packet transmission.

Figure 5:
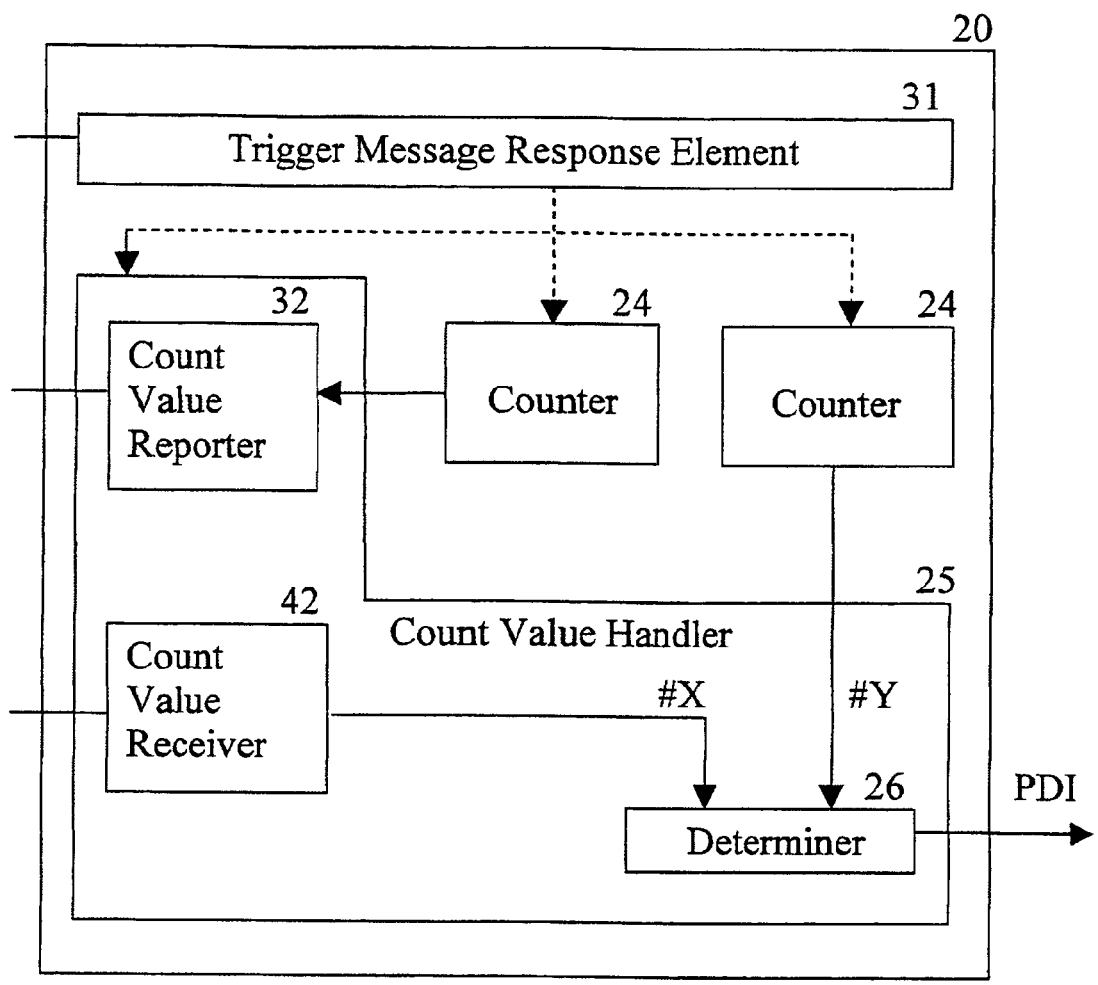
FIG. 5 shows a control device comprising a counter for determining the number of sent packets and a counter for determining the number of received packets.
Figure 7:
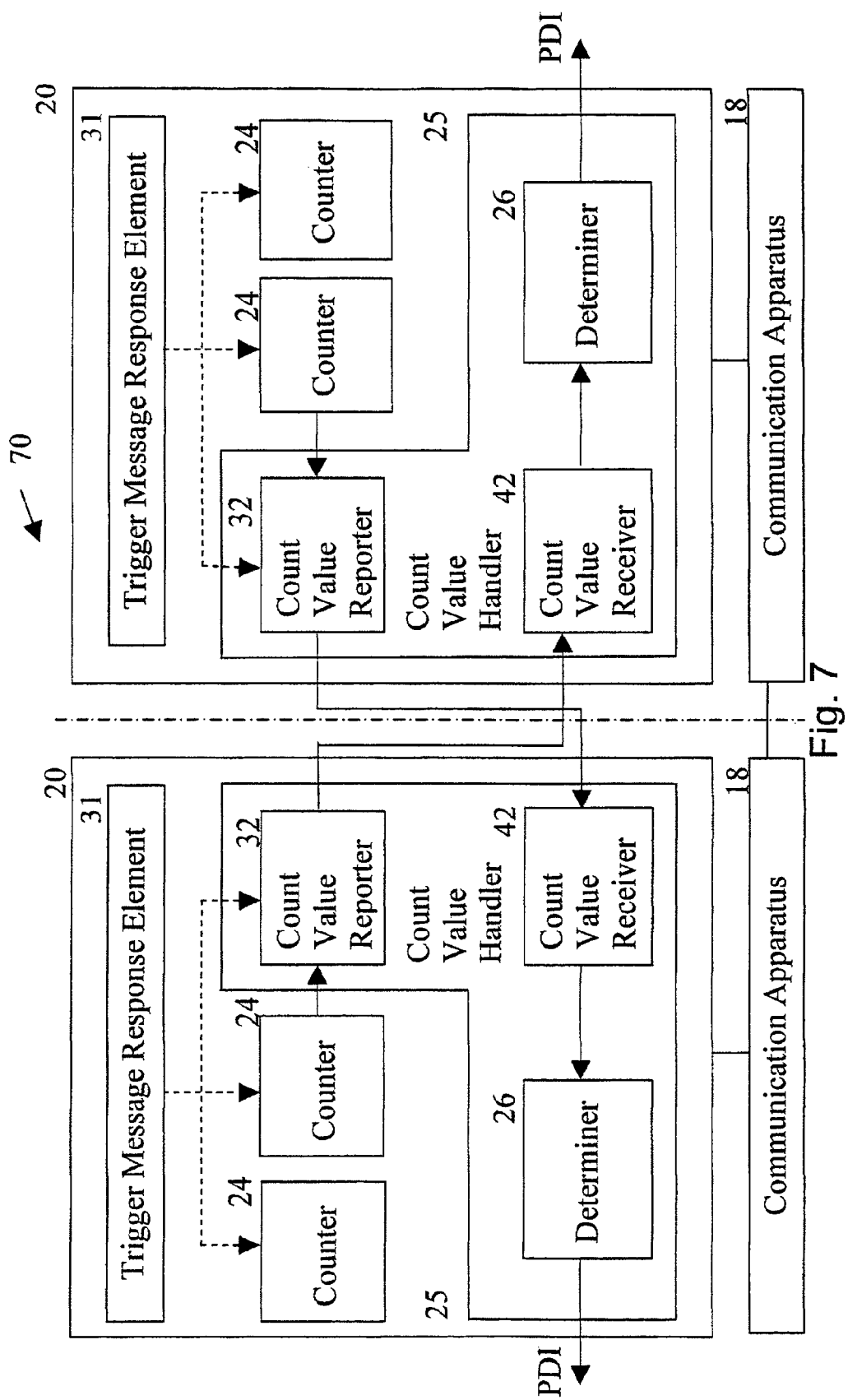
FIG. 7 shows a communication system comprising a transmission path, and the control device of FIG. 5 at the sending side and at the receiving side.

A further control device embodiment, as shown in FIG. 5, corresponds to a combination of features as described in relation to FIGS. 3 and 4 and has two counters 24 respectively arranged to count the number of packets sent and the number of packets received by a communication apparatus 18. The count value reporter 32 is arranged to report to the opposite side the count value of one of the counters 24. The count value of the other counter 24 is input together with a count value received from the opposite side by the count value receiver 42, and a PDI is determined from the two inputted count values by determiner 26. The count value reporter 32 and both counters 24 are triggered by a trigger message response element 31 as described above in relation to FIGS. 3 and 4. This embodiment, when incorporated on each side of a transmission path, for example as shown in FIG. 7, may allow determination of a PDI at each side for a respective direction of a bi-directional transmission path. As above, the determiner 26 may be a value comparator or a numeric calculator for dividing or subtracting the two values.

In the embodiments described herein, information concerning packet communication may be gathered over predetermined time periods T1, T2. Such information may be transmitted in monitoring messages (e.g. information messages and/or trigger messages, as described in more detail below) to a control device 20 on the opposite side or to a management unit 19 in which PDI calculation takes place. Such monitoring messages may be transmitted relatively infrequently compared to the transmission of the monitored packets themselves. Therefore, packet delivery can be monitored in an embodiment without loading the network or path with a large amount of traffic.

Referring again to FIG. 1, an embodiment in the form of a monitoring agent 15 incorporates a control device 20 as described above in relation to any of FIGS. 2-5, and is directly attachable to a communication apparatus 18 arranged to mirror the sending and/or receiving of packets to the monitoring agent 15. Monitoring functions are carried out by a combination of a counter 24 and a count value handler 25 as described above. However, these functions are provided in a respective monitoring agent 15 at the sending and/or receiving side 11, 12, instead of e.g. directly in the same circuitry or self-contained unit as the associated communication apparatus 18. As part of the procedure for determining a PDI, the count value handler 25 may itself determine a PDI on the basis of the two determined numbers of packets, or this functionality may be provided in a management unit 19 that communicates with one or more of the sides 11,12 and thereby receives statistics concerning the numbers of packets.

In an embodiment, the use of a separate monitoring agent 15 associated with a communication apparatus 18 allows the reduction of processing capacity requirements in receiving and sending side apparatuses such as edge routers or ingress/egress agents.

It is to be further noted that a communication apparatus that is associated with a control device 20 according to any embodiment apparatus embodiment described herein may be an ingress or egress node, respectively, of a communication network, or may be a router, for example.

A control device 20 of an embodiment described above may be programmed to operate in accordance with programming instructions input, for example, as data stored on a data storage medium 110, 112 (such as an optical CD ROM, semiconductor ROM, magnetic recording medium, etc.), and/or as a signal 111, 113 received, for example, from a remote database, by transmission over the communication network (e.g. the Internet), and/or entered by a user via a user input device such as a keyboard.

Figure 6:
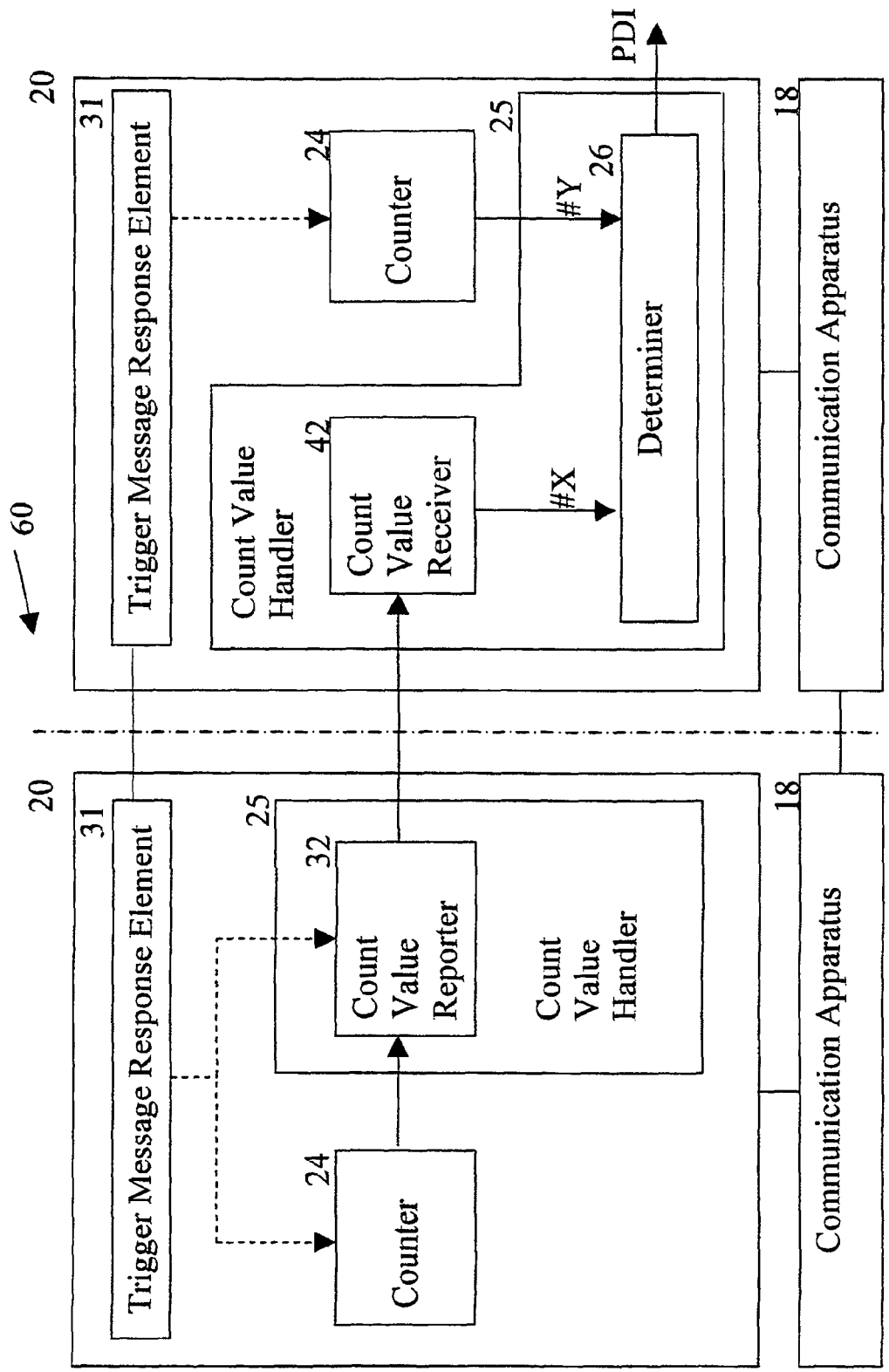
FIG. 6 shows a communication system comprising a transmission path, the control device of FIG. 3 and the control device of FIG. 4.

The system embodiment 60 shown in FIG. 6 comprises on one side of a transmission path a control device 20 as shown in and described above in relation to FIG. 3, and on the other side of the transmission path a control device 20 as shown in and described above in relation to FIG. 4. Each control device is associated with and may be comprised within a corresponding communication apparatus 18. Such an embodiment may allow determination of a PDI for a single direction of packet flow between two communication apparatuses.

In a modification of this embodiment, the determiner 26 of the control device on one side one may alternatively be provided in a management unit 19. In such a modification, the corresponding counter 24 of that one side reports its value to the management unit 19. Furthermore, the respective count value reporter 32 on the opposite side may report directly to the management unit 19 and the count value receiver 42 be provided in the management unit 19.

The system embodiment 70 shown in FIG. 7 comprises on each side of a transmission path a control device 20 as shown in and described above in relation to FIG. 5. Each control device is associated with and maybe comprised within a corresponding communication apparatus 18. Such a system may allow determination of PDIs for both directions of packet transmission in a bi-directional network path.

In a modification of this embodiment, at least one of the determiners 26 may be provided in a management unit 19. In such a modification, the corresponding counter 24 reports its value to the management unit 19, as described above in relation to FIG. 6. Furthermore, the respective count value reporter 32 at the opposite side may report directly to the management unit 19 and the corresponding count value receiver 42 be provided in the management unit 19, as described above in relation to FIG. 6.

Figure 8:
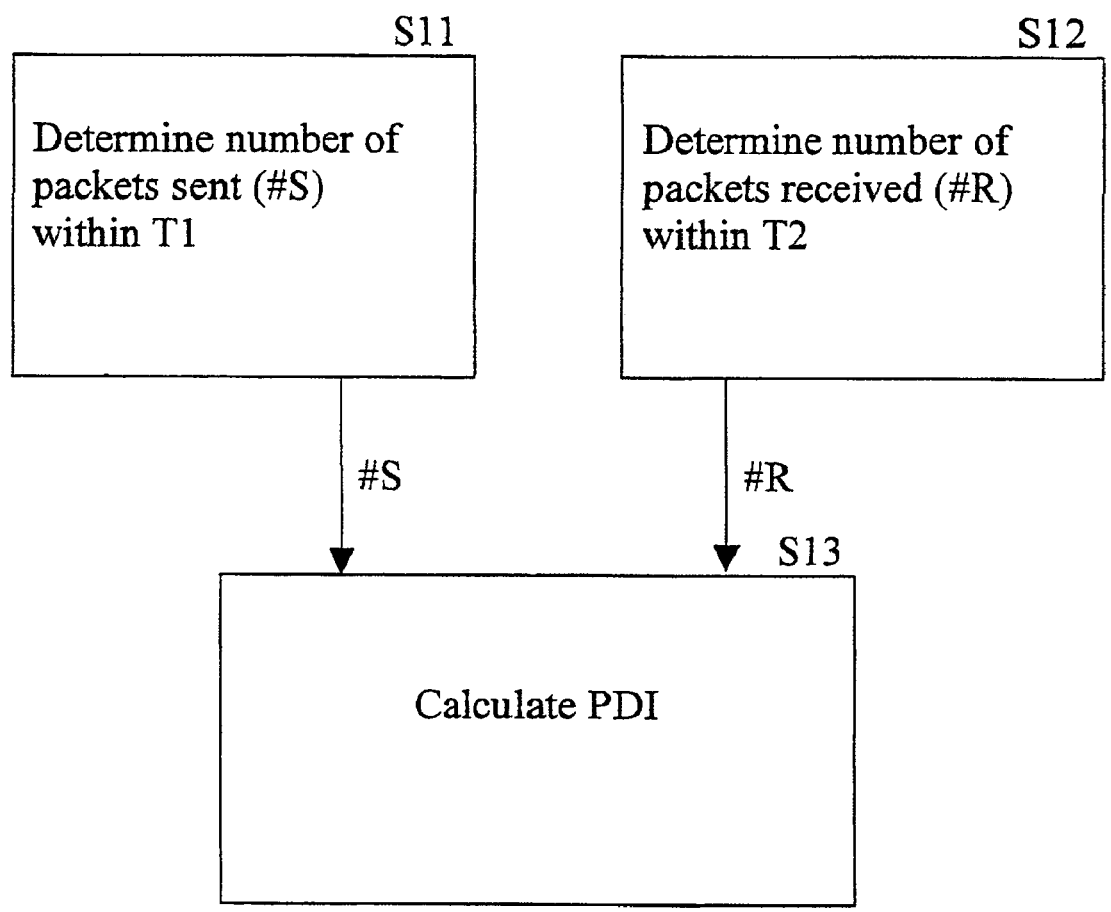
FIG. 8 shows a method of determining a PDI on the basis of determined numbers of packets sent and received within respective time periods.

A first method embodiment is shown in FIG. 8 and described below with further regard to the control device 20 of FIG. 2. The number of packets sent within a first time period T1 by a communication apparatus 18, which is associated with and may comprise a control device 20 at the sending side 11, is determined in step S11, for example in a counter 24 of the control device 20. The number of packets received within a second time period T2 by a communication apparatus 18, which is associated with and may comprise a control device 20 at the receiving side 12, is determined in step S12, for example in a counter 24 of that control device 20. A PDI is then calculated in step S13 by a determiner 26, on the basis of the two determined numbers of packets. Determination of a respective number of packets by a control device 20 may be performed in various ways, for example by receiving an indication of the number, such as a count value, or by counting the sent or received packets.

In the first method embodiment, a PDI may, for example, be suitable for indicating the proportion of packets that are dropped i.e. are sent from the sending side but not received by the receiving side. In this case, the indicator may for example be a Packet Loss Ratio (PLR) calculated for example according to the formula $$PLR = 1 - PCK(r)/PCK(s),$$

where PCK(s) and PCK(r) are values that have been received by the control device 20 or counted by the PDI determiner 26 and indicate the number of sent and received packets, respectively. However, the skilled person would obviously recognise that there are other ways of determining a PDI. For example, the PDI may be calculated by a comparison of the sent and received packet numbers, to provide for example a logic value indicating that the number of received packets is less than or equal to the number of sent packets. Alternatively, the PDI may be calculated by obtaining the numerical difference between the values.

Thus, an embodiment allows a path, such as an edge-to-edge (E2E) path, between a sending side and a receiving side, to be monitored. Furthermore, an embodiment may allow a PDI to be determined based on determined numbers of sent and received packets.

In one system performing the first method embodiment, one or both sides may report an indication such as a count value to the opposite side at the end of step S11 or S12, for example by means of a count value reporter 32. A determiner 26 of the opposite side then calculates the PDI on the basis of the received indication and a value counted at said opposite side. On the other hand, indications such as count values from both sides may be reported to an additional apparatus, such as a management unit 19, where the PDI calculation takes place, so that there is less need for informing from one side to the other and a reporter such as a count value reporter 32 at each side therefore reports to the additional apparatus.

In other words, in the above system performing the first method embodiment, a first alternative consists in the sending side determining the number of packets received at the receiving side by receiving an indication thereof, determining the number of packets sent by counting, and calculating a PDI. In a second alternative, the receiving side determines the number of packets sent by the sending side by receiving an indication thereof, determines the number of packets received by counting, and calculates a PDI. In a third alternative, the numbers of packets sent and received may each be determined by receiving an indication, such as a count value, at a management unit 19 where a PDI calculation takes place. Furthermore, any combination of these and/or further alternatives may be implemented in an embodiment.

Where a number of packets is determined in a performance of the first method embodiment by receiving an indication such as a count value of packets sent or received in a time period T1 or T2, the indication may be received in an information message. An information message may be any data unit containing an indication of a number of sent/received packets of one side and, optionally, further parameters relating to QoS, such as values relating to a QoS behaviour (e.g. delay, security, traffic class separation).

Thus, in the second alternative above, a sending side information message comprising the indication of the number of packets sent within the first time period T1 may be sent from the sending side to the receiving side. Similarly, in the first alternative, a receiving side information message comprising the indication of the number of packets received within the second time period T2 may be sent from the receiving side to the sending side.

Furthermore, in the first or second alternatives above, both the sending and the receiving sides may send information messages, so that a PDI can be determined at both sides. However, where PDI determination is required only at one side, there is less need for both sides to send information messages containing count values. Nevertheless, in this case, it may be advantageous for the side performing the PDI determination to send such an information message to the other side, in order to identify the loss of monitoring messages (trigger or information messages; as described below in relation to Step E. of the first specific embodiment).

PDI determination according to the first method embodiment may be performed at a specific time determined by a user or management unit 19, or repeatedly. In the latter case, the method steps of FIG. 8 may be performed at regular intervals. Thus, in the first method embodiment implementing any of the above alternatives, the three method steps of FIG. 8 may be performed one or more times, each with corresponding first and second time periods T1, T2 for the sending and receiving sides, respectively. A one-off specific timing or a frequency of repeatedly determining a PDI, for example, may be fixed or configurable according to monitoring requirements.

If a PDI is to be determined at regular intervals, the time periods T1, T2 may be substantially equal to the time interval between successive PDI calculations, or may be shorter than the latter interval if one or more clock signals are used to time the periods T1, T2 independently of the timing of PDI calculations. Where, for example, only a low frequency of PDI determination is required in an embodiment, the processing load in each side relating to packet number determination such as by counting can be maintained at a low level if the periods T1, T2 are set shorter relative to the intervals between PDI calculations.

Advantageously, the lengths of the time periods T1, T2 are substantially equal. However, where, for example, packets are sent in isolated bursts and monitoring the actual arrival of the packets is of greater importance than the arrival thereof within a predetermined time period, the periods may not be equal.

Where the steps of FIG. 8 are performed successively a plurality of times and indications are communicated in information messages as described above, each sending-side information message containing an indication of the number of packets sent from the sending side during a first time period T1 may further identify the particular first time period concerned, and/or each receiving side information message containing an indication of the number of packets received from the receiving side during a second time period T2 may further identify the particular second time period concerned. The time period identifier of the indication may, for example, be a sequence number as described below, and may allow an embodiment to calculate an accurate PDI even when an information message has been dropped.

Thus, measurement may be based in an embodiment not on numbers of probe packets as in active monitoring, but on information that is transferred in information messages. This may allow packet delivery monitoring over a wide range of time-scales. Consequently, an embodiment may allow monitoring of short-term transport service degradations and/or conventionally low packet loss ratios.

More specifically, in an embodiment, the counting or receiving of packet numbers corresponding to time periods T1, T2 and determination of a PDI on this basis allows an embodiment to monitor, detect and/or accurately measure, transport degradation events over small time intervals. This is because, for example, if polling is not required because counting of sent/received packets is carried out over predetermined time periods T1, T2, monitoring statistics do not depend on delivery of probe packets and, furthermore, the monitoring can be performed independently of existing traffic patterns. An embodiment thereby allows the determination of a PDI, such as a transport edge-to-edge packet loss ratio, where packet drop rate is very low or where packet drops occur during very short isolated time intervals. Furthermore, the time periods T1, T2 may be programmable or fixed to any length of time upto a maximum depending on, for example, the maximum counts of counters associated with control devices 20. Therefore, an embodiment allows packet delivery monitoring that is applicable or configurable to operate over a wide range of time-scales.

Short-term transport service degradations and conventionally low packet loss ratios can have serious effects on real-time applications. For example, mean opinion score analyses shows that packet/cell loss ratios of the order of just a few percent cause a non-negligible effect on perceived voice quality for all different types of currently used codecs. Packet loss ratios of 10-20% result in most differently encoded voice applications being deemed to be of unsupportable quality. Experiments show that, if the situation persists for more than 5 seconds, most users experiencing such degradation will hang up the call.

Delivering services with very low packet loss ratios is important for most packet-switched applications and will become even more important in the future as the throughput of different access technologies (Digital Subscriber Line (DSL), High-Speed Downlink Packet Access (HSDPA), Super 3G Architecture (S3G)) increases. For example, as described in "Service Requirements for an All-IP Network (AIPN)", 3GPP TS 22.258 V1.0.0 (Release 7, 2005-07), 3GPP (3rd Generation Partnership Project) standards specify an acceptable value of packet loss ratios of 0.001% in good radio conditions but a maximum of 0.1% for 3GPP Release 7 networks.

The importance of small degradations over low time-scales is further reflected in the existing standards for legacy networks, as described for example in the specifications ITU-T G.821, ITU-T G. 826, ITU-T G.827 and ITU-T I.357. These specify Errored Seconds and Severely Errored Seconds as proper measures for describing transport dependability. The same is valid for existing standards for IP-MPLS networks, as described in, for example, ITU-T Y.1540 and ITU-T Y.1561.

Referring further to the first method embodiment of FIG. 8, when performed in a system 10 such as that shown in FIG. 1, uni- or bi-directional monitoring may be achieved. If the method of FIG. 8 is performed for the same direction such that both indications such as count values for the direction concerned become available at each side, or for both directions of packet flow in a path, PDIs may be calculated at both of the sending and receiving sides regarding the same or opposite traffic flows, respectively. An embodiment that monitors the same direction of flow in a path at both the sending and receiving sides may be useful where, for example, due to partitioning of an IP network into administrative domains, each operator has access only to one side of a particular path, whereas it may be useful for each operator to have all relevant statistics directly available.

Figure 9:
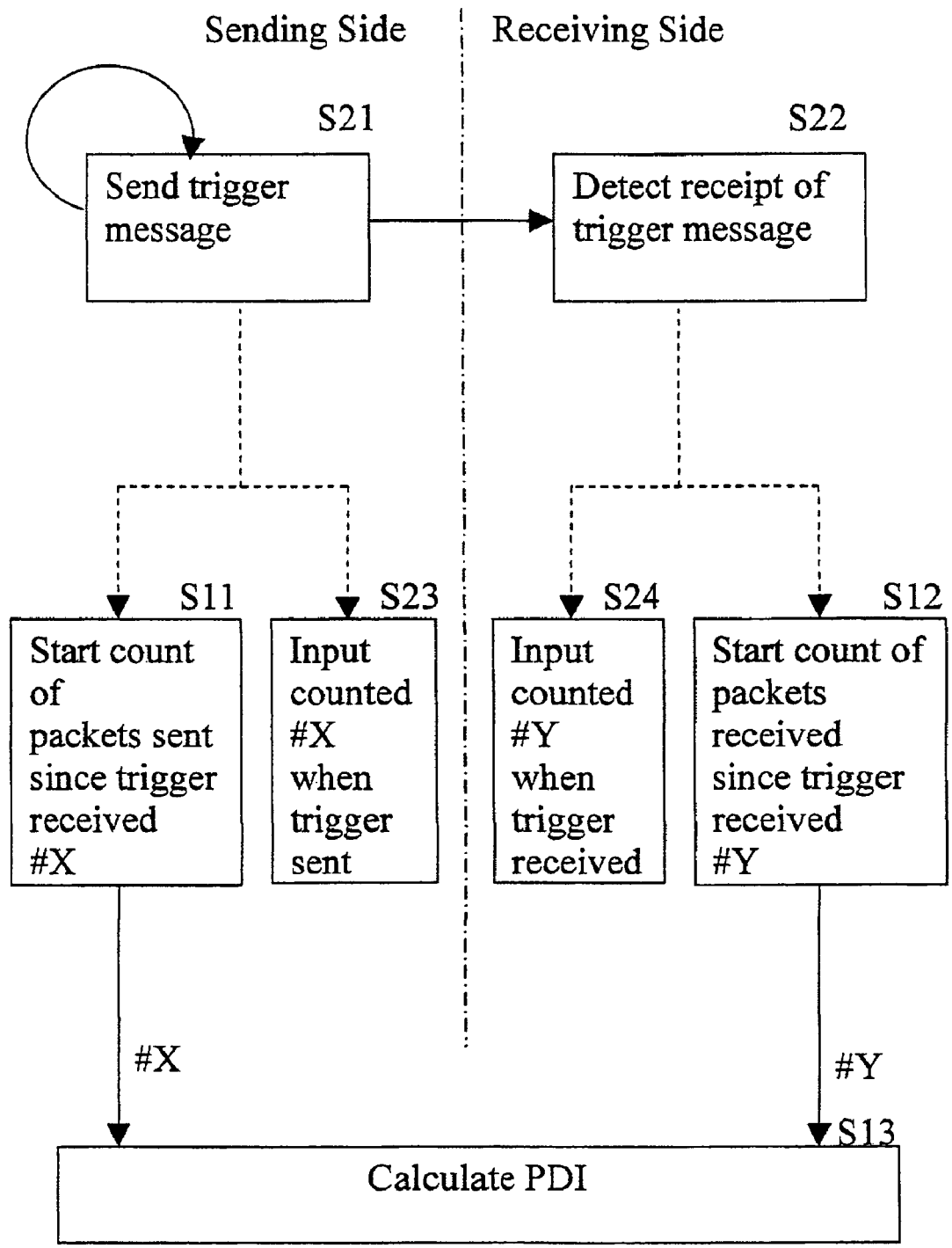
FIG. 9 shows PDI determination on the basis of sent and received packet counts that are synchronised by sending and receiving of trigger messages.

In a second method embodiment such as that shown in FIG. 9, trigger messages are communicated in one direction between the sending and receiving sides to synchronise corresponding time periods T1, T2. More specifically, a trigger message response element 31 in a control device 20 on each side sends (receives) successive trigger messages received by (sent from) such an element 31 on the opposite side. The start and end of one time period of a corresponding pair T1, T2 is thus determined at the respective side by the sending of two successive trigger messages, and the start and end of the other time period of the pair is determined at the opposite side by the receipt of two successive trigger messages. The determining steps S11, S12 and the PDI calculating step S13 are performed as described above in relation the first method embodiment. For accurate PDI determination, corresponding time periods T1 and T2 are advantageously of equal length and synchronised. The time period at the sending side 11 using trigger messages as described above is substantially the same as that at the receiving side 12, but may differ slightly due to, for example, network jitter or varying propagation delays of trigger messages over the transmission path.

Trigger messages may further be sent as described above at regular intervals, so that the sending or receipt of each successive trigger message at each side triggers the end of one time period and the start of the following time period at the respective side. Nevertheless, it is to be noted that determination of time periods T1, T2 by the sending and receiving of trigger messages is not a requirement of the present invention even for repeated PDI determination, as the first and second time periods T1, T2 may be determined by separate clock signals internal to and/or shared by the sending and receiving sides, respectively.

As a further example, sending and receiving of trigger messages may instead synchronise only the start or end of respective time periods T1, T2, the length of each period being determined by, for example, an internal timer at the respective side.

In addition to determining the start and/or end of corresponding time periods T1, T2, trigger messages may synchronise respective monitoring processes such as resetting of counters or sending (e.g. in an information message) of an indication of a number of sent/received packets.

Specifically referring to FIG. 9 in view of the above description regarding trigger messages, where a number of sent or received packets is determined in the second method embodiment by counting, the or each individual cycle of counting may begin and end according to the sending or receiving of two successive trigger messages. The PDI calculation step S13 is then performed on the basis of the final count values at the ends of the time periods. Furthermore, if trigger messages are sent at regular intervals, each trigger message may cause resetting of, and the start of a new count at, the or each counter after the previous, final count value has been input to a PDI determiner 26 or reported to an opposite side or to a management unit 19.

The sending of successive trigger packets may be separated by a predetermined time period that may be fixed or configurable by programming a trigger message response element 31 in, for example, a control device 20 at the trigger sending side, a control device 20 of a monitoring agent 15 attached directly to a communication apparatus, or a management unit 19 that manages a control device 20 or monitoring agent 15.

Thus, an embodiment can be made scalable according to time-scale requirements, since time periods during which sent and received packets are counted, and/or time periods between sending trigger messages, may be set or made configurable (programmable) according to monitoring requirements. Furthermore, the loading of trigger and information messages on the network traffic, as well as the processing capacity relating to monitoring functions, for example in edge routers or agents, can thus be reduced in an embodiment.

In a modification of the second method embodiment, and where counting of packets is synchronised by the sending and receiving of trigger messages as described above, the sending of a trigger message from one side may further trigger the reporting of a count value from that side to the opposite side, and/or the receiving at the opposite side of the trigger message may trigger the reporting of a count value from that opposite side to the trigger message sending side. A PDI may then be calculated, as described in relation to the first method embodiment, at the one or more sides that are informed of a count value from an opposite side.

In a further modification of the second method embodiment, where one side sends trigger messages that initiate the counting of packets on each side, and the trigger message sending side informs the opposite side of a counter value, that counter value may be included in a trigger message. (Although it is advantageous in a triggered monitoring system embodiment to include count values in trigger messages, this is not a requirement as the count values may instead, for example, be sent in separate information messages). If a count value is to be included in the next trigger message to be sent, the count value may be input to the respective trigger message response element 31 for sending trigger messages immediately before the trigger message is sent and the respective counter 24 is reset.

In such a further modification, one side 11 may send one trigger message at regular intervals to the other side 12, each trigger message containing the number of packets sent in the preceding time period T1. Upon receiving the trigger message, the other side responds with an information message that contains the information about the packets received from the given path, such as the number of packets received in the corresponding time period T2. Using the information about the sent and received packets, the trigger sending side is thus able to calculate a PDI corresponding to the time periods T1, T2.

In the second method embodiment, each sending and/or receipt of a monitoring message (trigger and/or information message) may be counted in the counts of sent and/or received packets, respectively.

Furthermore, other information concerning QoS parameters, for example related to QoS differentiation of traffic classes, security or the propagation delays of packets, required for monitoring may be included in information messages and/or trigger messages.

In order to illustrate more clearly the synchronisation method using trigger messages that may be implemented in modifications of the second method embodiment, two examples are given below. The synchronisation method is substantially the same in both of the examples, the primary difference being related to which side is the preferred side to perform the PDI calculation and/or communicate with a management unit 19.

In the first example, a PDI determination is performed at the receiving side 12. The receiving side 12 counts packets received during the time period T2 between receipt of two successive trigger messages, and the sending side 12 counts packets sent during the time period T2 between sending of successive trigger messages and sends an information message containing the corresponding count. When a new trigger message arrives at the receiving side, the counter is reset and a new count is started. Similarly, when a new trigger message is sent at the sending side, the counter therein is reset and a new count is started. Then, a PDI calculation is carried out as described in relation to the first method embodiment, for example: the number of received packets divided by the counted number of sent packets. The PDI may further be forwarded to a management unit 19 by the receiving side 11, as described in relation to the embodiments above.

In the second example, the PDI determination is to be performed at the sending side 11. The receiving side 12 forms an information message containing the corresponding count at the end of a counting period T2 determined by the arrival of two successive trigger messages, and the sending side 11 counts packets received during the time period T2 between receipt of two successive trigger messages. Specifically, the receiving side 12 puts the current count value in an information message and sends it back to the sending side 11. Then, a PDI calculation is performed by the sending side as described above in relation to the first method embodiment, and the result may further be sent to a management unit 19.

Modifications of the second method embodiment as described above in relation to monitoring (trigger, information) messages may be suited for networks in which there is a zero or small packet drop ratio, in other words when the network is designed to deliver good services for most of the time. In case of a large packet drop ratio, the probability of loss of monitoring messages becomes correspondingly higher. In this regard, such modifications may advantageously further include mechanisms involving time period sequence numbers to provide accurate PDIs, such as packet loss ratio measurements, even when monitoring messages are dropped.

In such a modification, loss of a monitoring message may be detected by monitoring sequence numbers that correspond to particular time periods and are specified in corresponding received monitoring messages. For example, if loss of a trigger message intended to trigger the end of a time period T1, T2 occurs, the period of determined and calculated statistics may become longer, and counting being automatically re-synchronised when the next trigger message arrives. However, the monitoring of sequence numbers of successively received monitoring messages may detect when a longer counting period has occurred and, optionally, how long (e.g. how many multiples of a predetermined interval between sending of trigger messages) that longer period was. On the other hand, if such a trigger message loss occurs but counting stops after a predetermined time period and so does not continue until a following trigger message arrives, periods with missing statistics may be detectable by monitoring sequence numbers of monitoring messages. Further details of the use of sequence numbers, which are applicable to the present embodiment for detecting loss of monitoring messages and re-synchronising, are described in relation to step E. of the first specific embodiment below.

Where a modification of the second embodiment involving sequence numbers as described above is implemented in a network with high packet loss ratios, statistics concerning loss of trigger and/or information messages themselves may be used as a specific Key Performance Indicator (KPI) for describing such high packet loss ratio cases or detecting connectivity loss, in a similar way as with the Ping service used in conventional networks employing active monitoring. In this case, in addition to the features of the second method embodiment as described above, the method steps of FIG. 8 may be further applied, wherein the counted packets are the monitoring messages (trigger and/or information messages) themselves. Then, the trigger and/or information message statistics may be used as complementary KPIs for measuring average delays and edge-to-edge delay variation or for detecting, for example, connectivity problems. In such an embodiment, the monitoring messages may work not only in a similar way as a Ping service as referred to above, but may even replace a Ping service.

Figure 10:
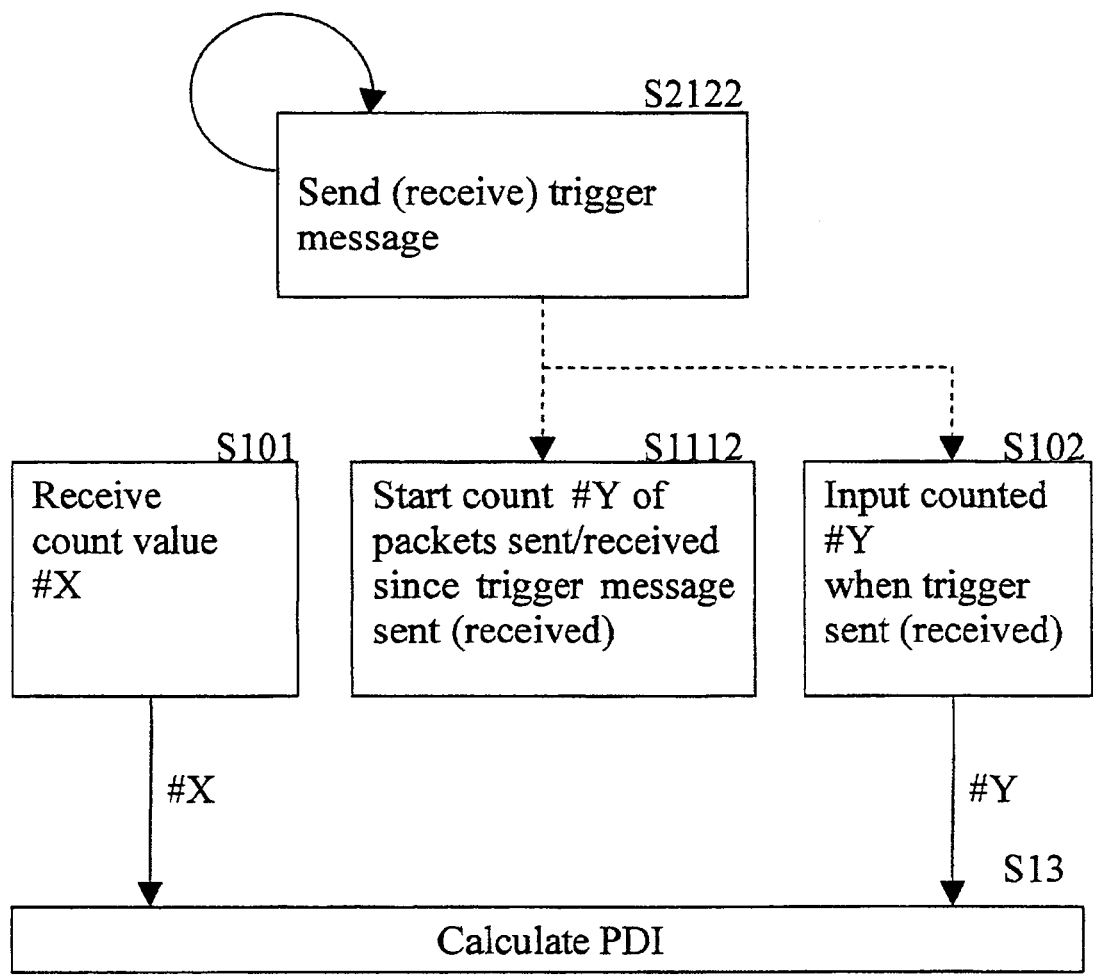
FIG. 10 shows PDI determination at one side on the basis of a value counted at that side and a received count value, in synchronisation with sent or received trigger messages.

According to a third method embodiment, such as that shown in FIG. 10, and including the steps of the first method embodiment of FIG. 8 as described above, trigger messages are communicated (either sent or received) by a trigger message response element 31 as described in relation to FIG. 3 or 4. The trigger messages are communicated at one side in successive steps S2122 corresponding to step S21 or S22 of FIG. 9. Packets sent or received by a communication apparatus between the communication of successive trigger messages at that side are counted in step S1112 corresponding to step S11 or S12 of FIG. 9. A count value is received by a count value receiver 42 as described in relation to FIG. 4 from the opposite side in step S101, and a PDI is determined by a determiner 26 in step S13 corresponding to step S13 of FIGS. 8 and 9 on the basis of the received count value and the value counted at the one side and input to the determiner 26 in step S102.

In any of the above embodiments, the PDI may be calculated as described in relation to the first method embodiment.

Figure 11:
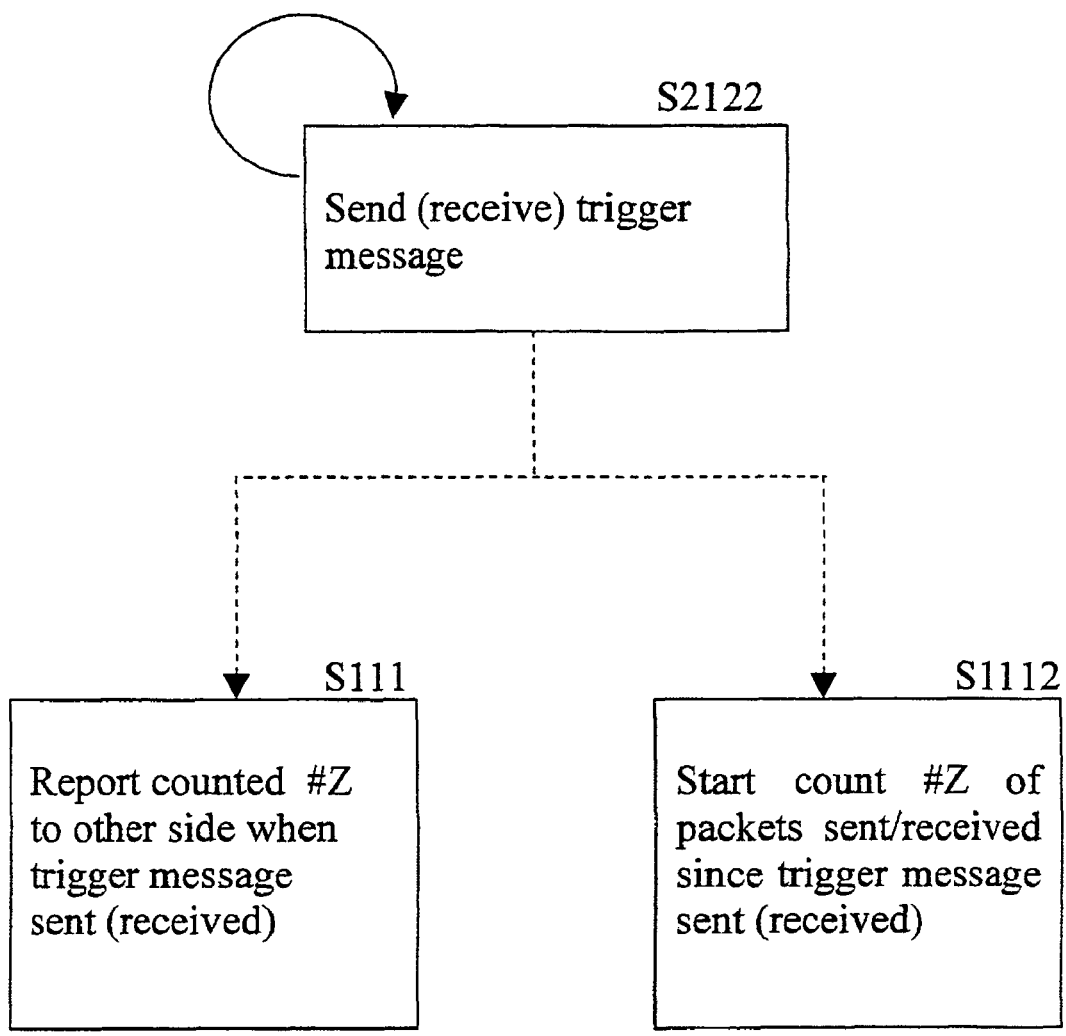
FIG. 11 shows the sending or receiving of successive trigger messages to determine the time period during which sent or received packets are counted at a side.

According to a fourth method embodiment, reporting a number of packets is achieved by counting at the sending side or receiving side the number of packets sent or received at that side within a time period T1, T2 and reporting the counted value to the receiving side or sending side, respectively. As shown in FIG. 11, trigger messages may be communicated (sent or received) by a trigger message response element 31 as described in relation to FIG. 3 or 4 in successive steps S2122 corresponding to step S21 or S22 of FIG. 8. Packets either sent or received by a communication apparatus since the last sending of a trigger message (or last detection of receipt of a trigger message) at that side may then be counted in step S1112 corresponding to step S11 or S12 of FIG. 9 until a further trigger message is sent (received), and the final counted value of each counting cycle reported to the other side (or to a management unit 19) in step S111 by a count value reporter 32 as described in relation to FIG. 3.

An embodiment in the form of a storage medium 110, 112 as shown in FIG. 1 stores computer program instructions operable to perform a method of any of the above embodiments. Such a storage medium 110, 112 may be e.g. an optical CD ROM, semiconductor ROM or magnetic recording medium.

An embodiment in the form of a signal 111, 113 as shown in FIG. 1 may be received by a programmable apparatus, for example, from a remote database, by transmission over the communication network (e.g. the Internet), and/or entered by a user via a user input device such as a keyboard. Such a signal carries computer program instructions such as described above in relation to the storage medium embodiment.

Figure 12:
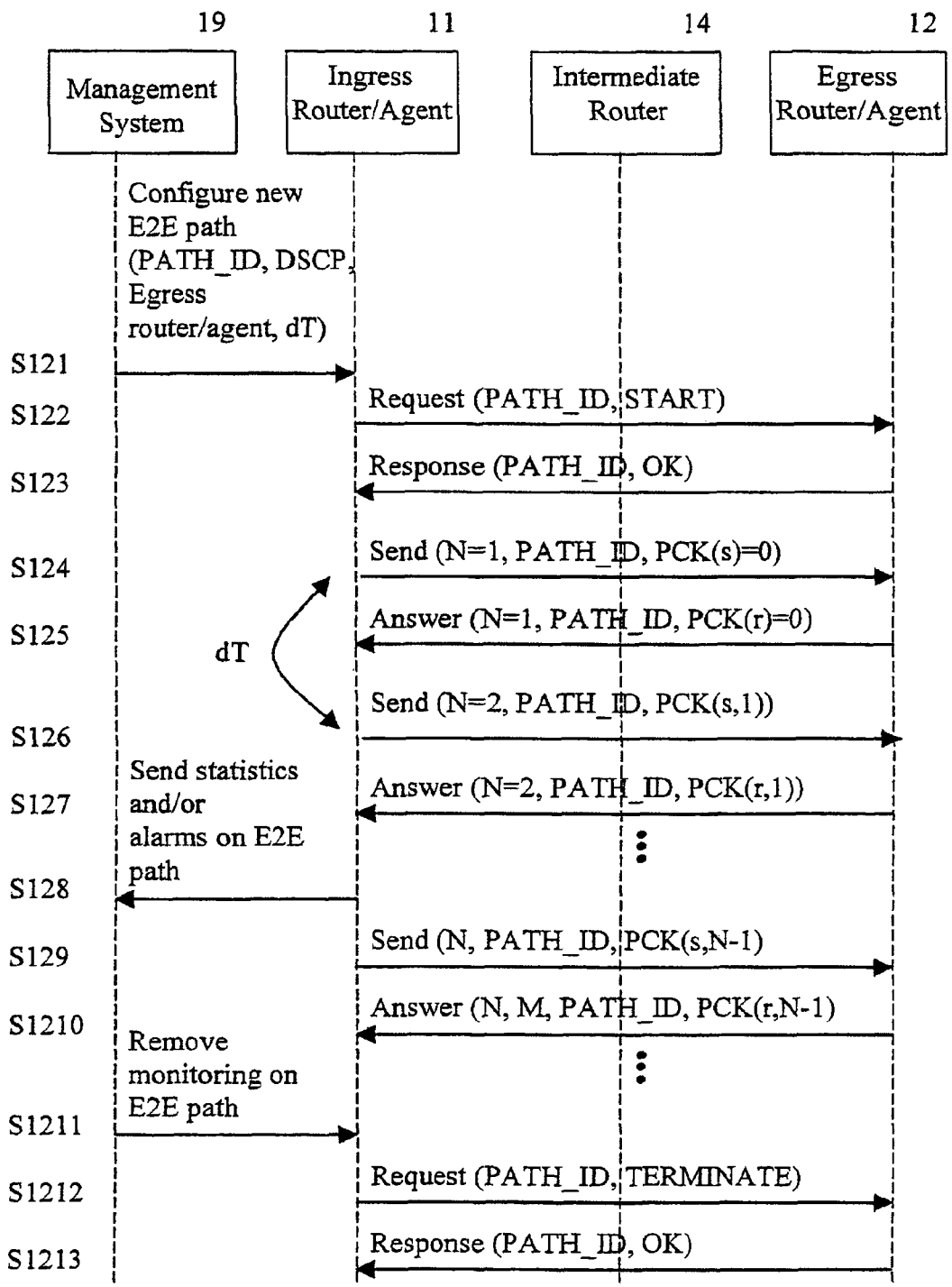
FIG. 12 shows a flow chart corresponding to the first specific embodiment, wherein the communication apparatuses are an ingress router/agent and an egress router/agent.

A first specific embodiment, as shown in FIG. 12, includes the following steps:

A. In step 121, a management system 19 configures the sending side 11 (referred to in the following as an ingress node, which may be e.g. a router or agent) to perform performance measurement on a new path for a given behaviour aggregate. The management system specifies:
  (i) the receiving side 12, which is referred to in the following as an egress node, and may be e.g. a router or agent;
  (ii) a path, for example using a path identifier (PATH-ID);
  (iii) the required measurement period dT for the packet statistics such as numbers of sent or received packets; and
  (iv) a preferred QoS.

If a path identifier (PATH-ID) is used, it is assumed that the path identifier (PATH-ID) identifying a path toward a pre-defined receiving side is known and is configured by the management system. For more accurate measurement on the path, session setup may be made to stop if a PATH-ID is erroneously configured, for example when an agent notices the misconfiguration.

The preferred QoS may, for example, be specified by using a value, such as a Differentiated Services Code Point (DSCP). A DSCP may be encoded in the DiffServ field of an IP header and is an example of traffic marking because its value corresponds to a preferred QoS.

Specifying the path and preferred QoS allows an embodiment to monitor packet delivery in a manner that distinguishes between different transport paths between edge nodes and/or can be applied separately for different classes of traffic.

Thus, an embodiment may be made transport and service aware in the sense that, for example, it can distinguish between different transport paths between given sending and receiving sides, and can be applied separately for different DiffServ classes. This may concern availability offered by the provider, promised traffic class-separation, QoS and security guarantees or exclusion of certain insecure domains from inter-domain paths.

B. In step S122, the ingress node sends a request message towards the egress node with the details of the path to be monitored. In step S123, the egress node sends back an affirmative response message if it is able to prepare to perform the measurements as specified, or may send a negative response message if it is unable to so prepare.

C. The ingress node counts the number of packets sent out on the path and sends out a trigger message periodically at time periods of dT, as in steps S124, S126 and S129. The trigger message includes, e.g.:
 (i) a QoS mark (e.g. a DSCP mark) of the same value as the behaviour aggregate to be monitored;
 (ii) identification of the path;
 (iii) the counted number of packets PCK(sN) sent out on the path within the last period dT; and
 (iv) a serial number N identifying the corresponding time period.

D. Similarly, in steps S125, S127 and S1210, the egress node counts the number of packets received on the given path and responds to each received trigger message with an information message that includes, e.g.:
 (i) the counted number of packets PCK(rN) received on the given path in the time period N specified in the trigger message;
 (ii) the serial number N of the received trigger message; and
 (iii) optionally, the serial number M of the previously received trigger message, i.e. the trigger message that triggered the start of the measurement of the current statistics. This is needed only if M<N−1, i.e. if some trigger messages from the ingress node have been lost.

E. The ingress node calculates a PDI e.g. in the form of a Packet Loss Ratio (PLR). The ratio PLR(N) corresponding to the serial number N of the trigger message may be calculated for the specified path and the time period dT(N) with the formula :

$$PLR(N)=1-PCK(rN)/PCK(sN)$$

F. In steps S128, calculated packet loss statistics such as the PLR are sent periodically to the management system by the ingress node, either after each time period dT or after longer periods each comprising several time periods dT. For scalability reasons, the ingress node may be configured to send statistics aggregated over longer periods, this being especially useful if calculated PDIs are within normal limits. An alarm threshold may be configured to trigger a notification to the management system when a numeric PDI such as a PLR exceeds a given threshold.

G. If it is decided to discontinue the measurements on the specified path, the management system sends this information in step S1211 to the ingress node, which in turn transmits in step S1212 a corresponding request identifying the path (e.g. the PATH-ID) to the egress node.

H. The ingress and egress nodes both remove the particular configuration corresponding to monitoring the specified path from their respective overall monitoring configurations and the egress node may confirm to the ingress node in step S1213 the removal of the particular configuration to the egress node.

In a modification of the above embodiment, the ingress node forwards the number of sent/arrived packets to the management system and the PDI computation is instead carried out at the management system.

In order to maintain the accuracy of the measurements, step E. above may differ slightly if losses of trigger messages and/or information messages occur. The sequence numbers of the trigger messages may be used to identify message losses, as described for example below:

(1) Trigger Message losses from the Ingress Node

In the case of trigger message losses from the ingress node, the egress node responds to the last trigger message received from the ingress node with an information message including a first sequence number identical with that of the sequence number N of the last trigger message, but also inserts a second sequence number M<N−1. The ingress node then calculates a PDI for a longer time period dT(K)=(N~M)dT(N), e.g. with the formula:

$$PLR = 1 - PCK(rN) \Big/ \sum_{K=M+1}^{N} PCK(sK)$$

This requires that the values of the last few measurements that have not yet been confirmed by the egress node should be stored in the ingress node.

(2) Information message losses from the Egress Node

In the case of information message losses from the egress node, the ingress node will for example not receive a response information message with the sequence number N. A PDI for the corresponding time period dT(N) is therefore not calculated by the ingress node. Alternatively, however, this method may be enhanced by inserting into the trigger message from the ingress node a new parameter with the sequence number of the information message that should be re-sent by the egress node. This requires, however, that the egress node stores the corresponding statistics.

In an embodiment, the automatic sending and receiving of trigger and information messages as exemplified in the above description of the first specific embodiment may reduce monitoring processing capacity requirements in receiving and/or sending side apparatuses such as edge routers or agents.

Furthermore, in an embodiment, the automatic sending of triggering messages and automatic responses to receipt of each trigger message with an information message reporting the current count value at the opposite side may allow fast PDI determination. For example, the first specific embodiment may allow a PDI such as a PLR to be measured fast because statistics may become available substantially instantaneously at a management system 19, or at least after approximately the time of a round-trip in the network path between sending and receiving sides.

Figure 13:
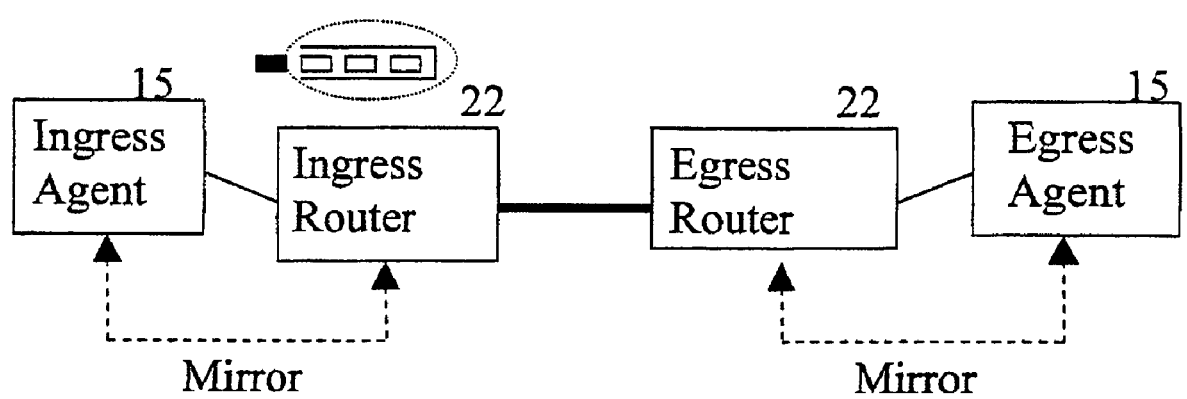
FIG. 13 shows a second specific embodiment, wherein a counting process is started upon sending a trigger message.
Figure 14:
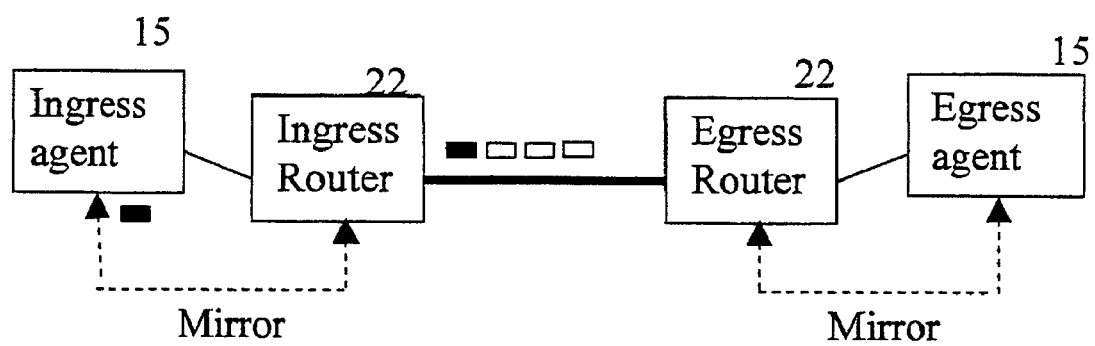
FIG. 14 shows a modification of the second specific embodiment, wherein packet counting is started when the sending of a trigger message is mirrored to an ingress monitoring agent.

A second specific embodiment performs the steps shown in FIG. 8 and advantageously implements the monitoring functions such as those described above in relation to FIG. 9 in separate monitoring agents 15, instead of directly in communication apparatuses 18 that perform the sending and receiving of packets at respective sides. (Communication apparatuses are represented in the following, for the purposes of example only, as routers such as edge routers). Thus, as shown in FIGS. 13 and 14, separate monitoring agents 15 are attached to respective routers 22 and perform the monitoring functions. In this case, the traffic through each router is mirrored to the attached monitoring agent.

FIG. 13 shows the second specific embodiment, wherein a counting process is started upon sending a trigger message, so that packets in the corresponding router queue are counted at the sending (ingress) side but not at the receiving (egress) side.

According to a modification of the second specific embodiment, for more accurate monitoring of packet losses, the ingress (sending side) monitoring agent 15 may start counting the user packets only when it receives notification of sending/receipt of a trigger message mirrored back from the attached router 22. FIG. 14 shows such a modification, wherein the packet counting S11 is started in the ingress monitoring agent when the sending of a trigger message is mirrored thereto, and wherein counting is synchronised between the ingress and egress monitoring agents 15.

As illustrated in FIGS. 13 and 14, if counting of user packets starts at the moment when the trigger message is sent from the ingress monitoring agent 15, then all packets between the ingress monitoring agent and ingress router (for example, packets in an ingress router queue) will be counted as packets sent in the specified time period by the ingress router. However, these packets will not be counted as packets received in the specified time period by the egress router, and this will cause an error when calculating a PDI such as a packet loss ratio. Therefore, in this case, monitoring by the ingress monitoring agent 15 advantageously relates to actual departures from the ingress router 15.

In an alternative embodiment, the features of the control device 20 of FIG. 2 are provided, for a sending or receiving side, in a monitoring agent 15 to which traffic is mirrored by an attached communication apparatus 18 such as an edge router.

For yet more accurate monitoring, the one or more monitoring agents described above is/are directly attached to their respective communication apparatus 18, such that there are no packet losses between any agent 15 and it's respective communication apparatus 18.

Figure 15A:
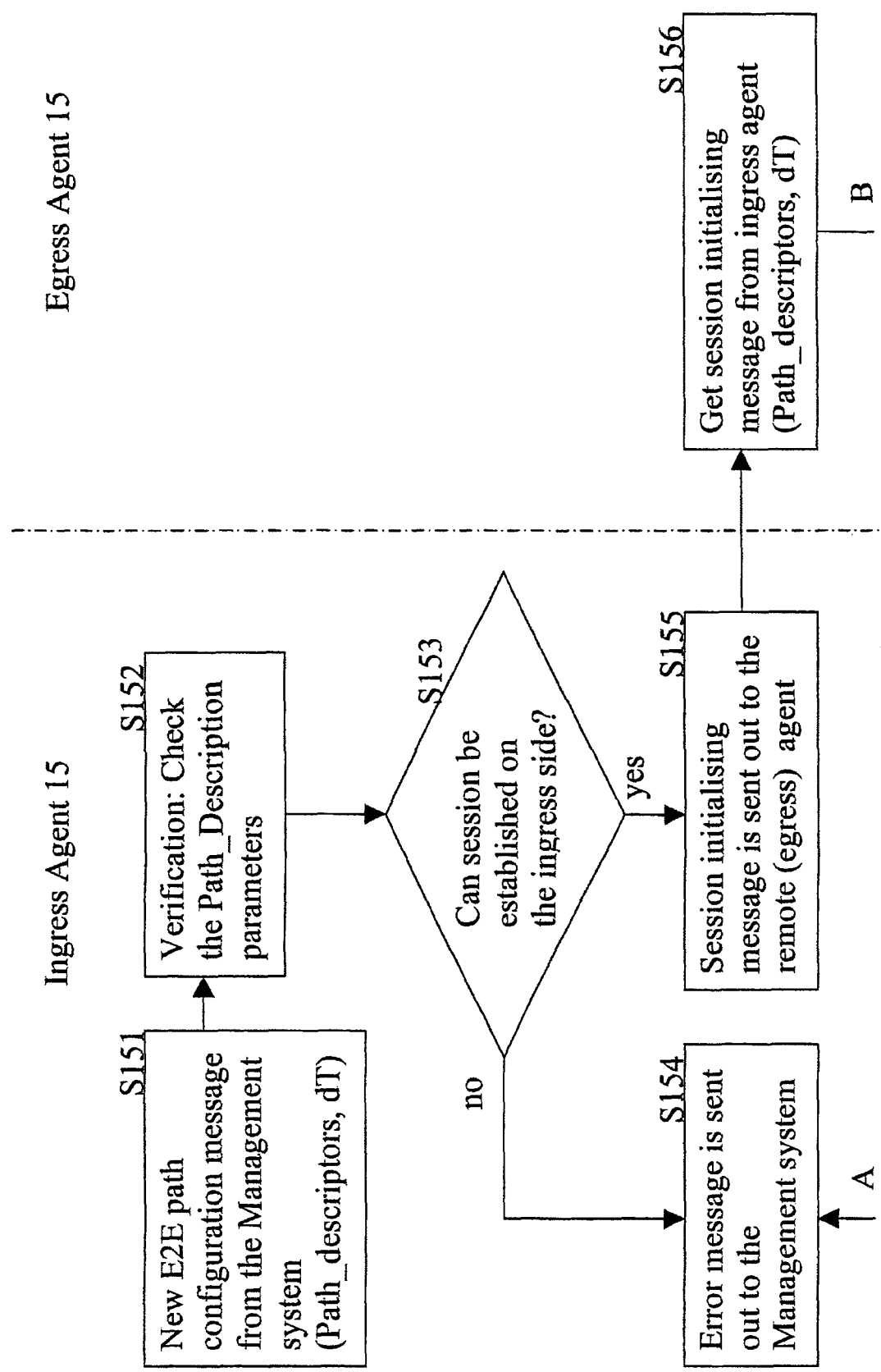
FIGS. 15A-C show a flow chart of functional operation of ingress and egress agents according to a third specific embodiment, wherein FIG. 15A joins FIG. 15B at points A and B and FIG. 15B joins FIG. 15C at points C and D.
Figure 15B:
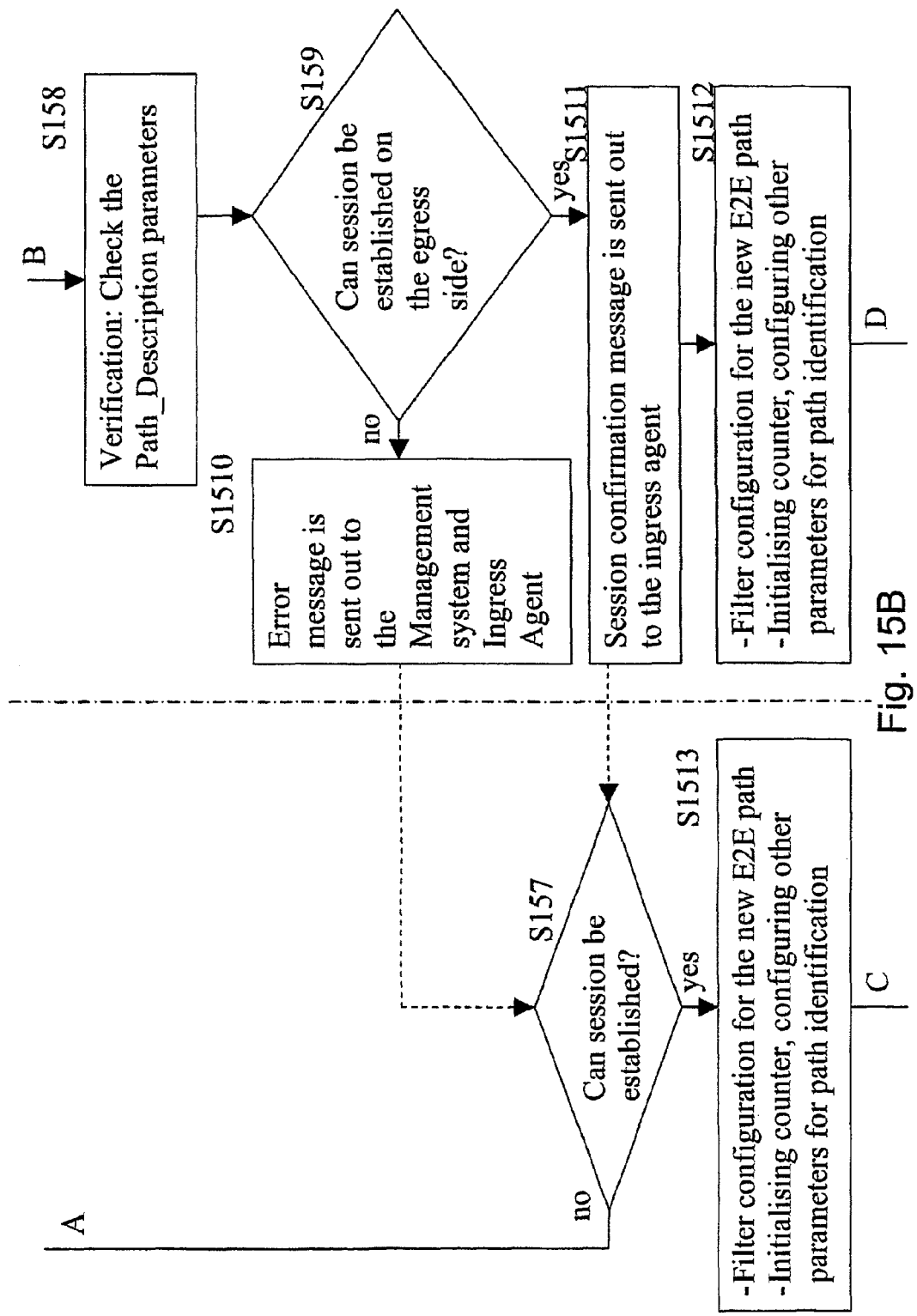
Figure 15C:
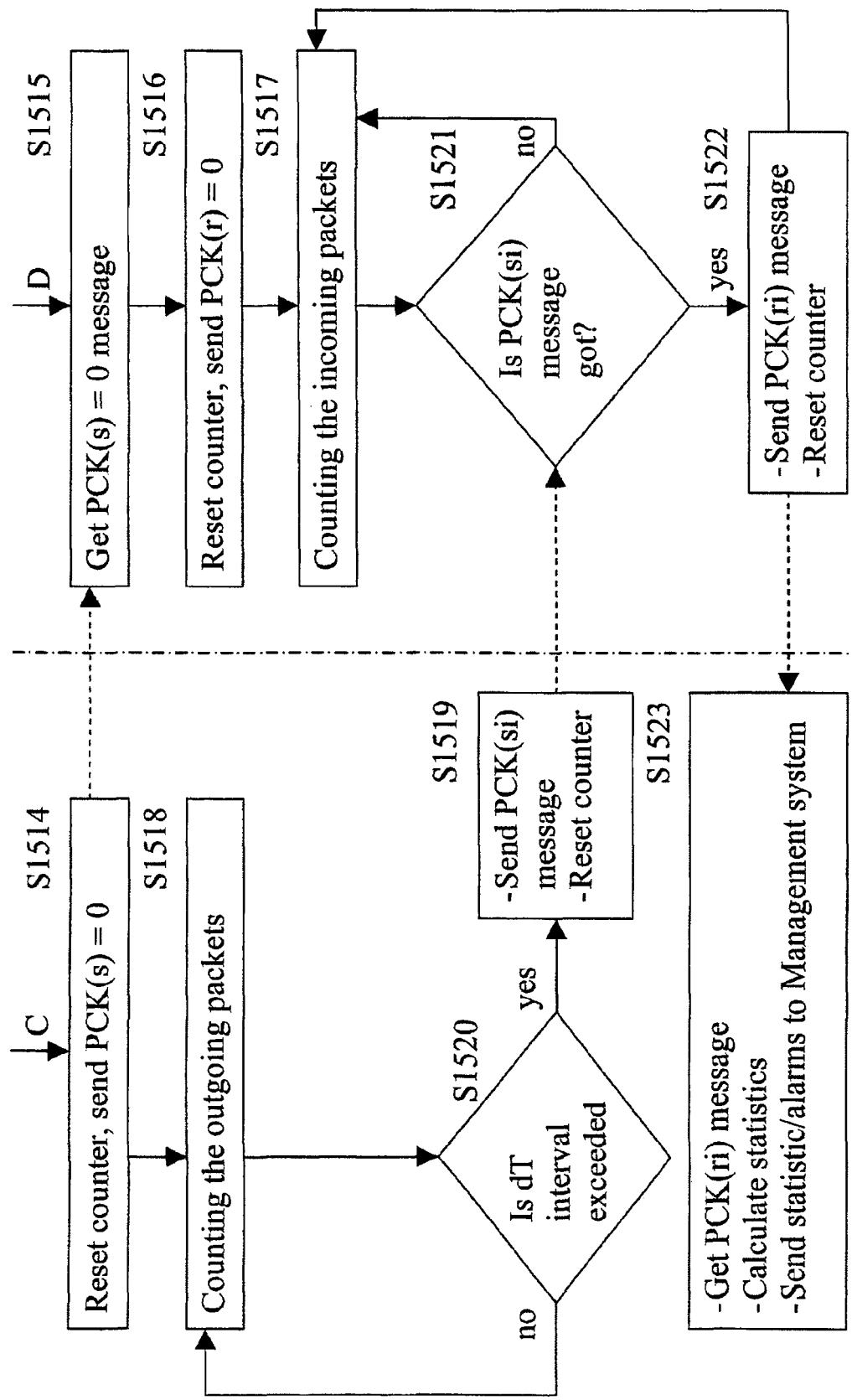

FIGS. 15A-C show method steps performed at sending and receiving sides 11,12 according to a third specific embodiment. For the purposes of example only, the sending side and receiving sides 11,12 are represented as an ingress node comprising an ingress agent 15, and an egress node comprising an egress agent 15, respectively.

Referring directly to FIG. 15, in step S151, a new edge-to-edge (E2E) path configuration message, which may include path descriptors such as a PATH_ID, and specify the length of a counting time period, it is sent from the management system 19 to the ingress agent 15. In step S152, the path description parameters are checked and verified. In step S155, if the parameter check indicates that the specified monitoring session can be established on the sending side 11, as determined in S153, a session initialising message is sent to the egress agent 15.

In step S156, the session initialising message is received in the egress agent 15. In step S158, the received session initialising message is checked and verified. In step S1510, if the parameter check indicates that the specified monitoring session can be established on the receiving side 12, as determined in S159, a session confirmation message is sent to the ingress agent 15 in step S1511.

If the specified session cannot be established as indicated by step S1510 or S1511 and determined by S157, or as indicated by S153, an error message is sent to the management system 19 in step S154.

If step S1511 occurs then, in step S1512 at the egress agent, filter configuration for the new E2E path is carried out, a counter 24 in the egress agent 15 is initialised and other parameters required for path identification are configured. The same applies to the ingress agent 15 in step S1513 if step S157 determines that the session can be established.

In step S1514, the ingress agent counter is reset and a trigger packet PCK(s)=0 is sent to the egress agent. In step S1515, the trigger message PCK(s)=0 is received by the egress agent and triggers step S1516 that resets the egress counter and sends an information message PCK(r)=0 to the ingress agent. In step S1517, the incoming packets are counted until a further trigger message PCK(si) is received in step S1521.

In step S1522, when PCK(si) has been received, an information message PCK(ri) is sent to the ingress agent 15, the egress agent counter 24 is reset and the counting step S1517 is re-started.

In step S1518, packets are counted in the ingress agent when trigger message PCK(s)=0 has been sent in step S1514 and continues until the specified counting time period expires as detected in step S1520, at which time the further trigger packet PCK(si) is sent to the egress agent 15 and the egress counter 24 is reset in step S1519. The counting step S1518 is then re-started.

In step S1523, the information message PCK(ri) is received at the ingress agent 15, a PDI is calculated and statistics and/or alarms are sent to the management system 19.

The successful set-up of a new monitoring session may depend on several factors, such as the ability to identify the path or behaviour aggregate, and free processing capacity in the sending and receiving sides. In the third specific embodiment, a path identifier, such as the PATH-ID, in a management configuration and specified in trigger messages, is used to identify a path towards a pre-defined egress node. A path identifier may be required since, in an IP network, a path cannot be identified by merely specifying the ingress and egress nodes if there are two or more different paths between them. For example, there may be one or more of the following:

Load sharing;
Virtual Private Networks (VPNs);
Static Routing; and
Source Routing.

Furthermore, there may be two or more different paths depending on, for example, the egress node interface and/or sending/receiving side IP addresses. Further still, a path identifier such as PATH-ID may require parameters such as a VPN identifier (VPNid), Label Switched Path (LSP) identifier (LSPid), or IP address range.

In the third specific embodiment, information indicating the number of packets PCK(s) sent by the ingress node is not required in the egress agent 15 for calculating a PDI such as a packet loss ratio at the ingress agent. However, the transmission of this information from ingress agent to egress agent could be useful if a PID such as a packet loss ratio were to be calculated at the egress agent in a modification of this embodiment.

In an embodiment, re-ordering of packets can adversely affect the accuracy of loss measurements.

However, as indicated in e.g. "Measurement and Classification of Out-of-Sequence Packets in a Tier-1 IP Backbone", S. Jaiswal et al., Infocom 2003, re-ordering is rare in conventional IP backbone networks. If an increase in the number of packets arriving relative to the number of packets sent is detected, then this may be taken as indicative of packet re-ordering or path misconfiguration.

Although the invention has been described above mainly with reference to embodiments wherein PDI calculation is carried out at one or both of the sending and receiving sides 11, 12, it is to be appreciated that the invention also applies to a method and apparatus that provide for the calculation to be performed instead at a management unit 19, the count values of each side being reported to the management unit 19.

Furthermore, in an embodiment, sending and receiving of trigger messages may take place at the sending and receiving sides, or vice versa, respectively, regardless of which sides count value reporting and PDI calculation take place at.

The invention has been described with reference to a plurality of embodiments and modifications. It is to be appreciated that the invention can comprise the features of the various embodiments and modifications taken singly, severally or collectively.

Certain embodiments may provide one or more technical advantages described herein.

Furthermore, modifications other than those described herein are, of course, possible.

The invention claimed is:

1. A method of determining a packet drop indicator, for use in a communication system comprising a sending side and a receiving side, comprising the following steps: A. determining the number of packets sent at the sending side within a first time period; B. determining the number of packets received at the receiving side within a second time period; and C. calculating a packet drop indicator on the basis of said number of sent packets and said number of received packets, wherein said sending and receiving sides are different sides connected via a transmission path; and wherein said step C is performed at said receiving side, said determining of step A comprises receiving an indication of the number of packets sent by said sending side, and said determining of step B comprises counting the number of received packets.

2. The method of claim 1, wherein said step C is performed at said sending side, said determining of step A comprises counting the number of sent packets, and said determining of step B comprises receiving an indication of the number of packets received at said receiving side.

3. The method of claim 1, wherein said step C is performed at a management unit, said determining of step A comprises receiving an indication of the number of packets sent by said sending side, and said determining of step B comprises receiving an indication of the number of packets received at said receiving side.

4. The method of claim 1, wherein said sending side sends a sending side information message to said receiving side, said sending side information message comprising an indication of the number of packets sent within said first time period.

5. The method of claim 4, comprising performing said steps A to C periods for a plurality of said first time periods and a plurality of corresponding second time periods.

6. The method of claim 5, wherein each of said sending side information messages comprises an indication of the number of packets sent within a particular one of said first time periods, and an indication identifying said particular one of said first time periods.

7. The method of claim 1, wherein said receiving side sends a receiving side information message to said sending side, said receiving side information message comprising an indication of the number of packets received within said second time period.

8. The method of claim 7, comprising performing said steps A to C for a plurality of said second said time periods and a plurality of corresponding first time periods.

9. The method of claim 8, wherein each of said receiving side information messages comprises an indication of the number of packets received within a particular one of said second time periods, and an indication identifying said particular one of said second time periods.

10. The method of claim 1, further comprising the steps of:
sending from said sending side to said receiving side a plurality of successive trigger messages; and
detecting at said receiving side receipt of successive trigger messages, wherein said first time period is associated with the sending of two successive trigger messages, and the second time period is associated with the receipt of two successive trigger messages.

11. The method of claim 10, wherein one of said trigger messages comprises a count value indicating the number of packets sent within said first time period.

12. The method of claim 10, wherein said trigger messages are sent at regular intervals.

13. The method of claim 1, further comprising the steps of:
sending from said receiving side to said sending side a plurality of successive trigger messages; and
detecting at said sending side receipt of successive trigger messages, wherein said first time period is associated with the receipt of two successive trigger messages, and the second time period is associated with the sending of two successive trigger messages.

14. The method of claim 13, wherein one of said trigger messages comprises a count value indicating the number of packets received within said second time period.

15. The method of claim 1, wherein the first time period is determined on the basis of clock signals internal to the sending side, and the second time period is determined on the basis of clock signals internal to the receiving side.

16. The method of claim 1, wherein the packet drop indicator is a packet loss ratio PLR defined as $$PLR = 1 - PCK(r)/PCK(s),$$

wherein PCK(s) and PCK(r) are the count values of sent and received packets, respectively.

17. A method of reporting a number of packets, comprising performing at one side of a communication system comprising a sending side and a receiving side the following steps: A. counting a number of packets sent or received within a time period; and B. reporting the counted value to the other side, wherein said sending and receiving sides are different sides connected via a transmission path; and wherein said time period is determined by detection of receipt of successive trigger messages.

18. The method of claim 17, wherein said time period is determined by the sending of successive trigger messages.

19. A control device for a sending side of a communication system comprising said sending side and a receiving side that are different sides connected via a transmission path, comprising: a counter for counting a number of packets sent at the sending side within a predetermined time period, and a count value handler for handling a count value determined by said counter in a procedure for determining a packet drop indicator; and a trigger message response element for determining said time period on the basis of trigger messages sent successively by said sending side.

20. The control device of claim 19, wherein said count value handler (25) comprises a count value reporter for sending said count value to one or both of the receiving side and a management unit.

21. The control device of claim 19, wherein said count value handler comprises a count value receiver for receiving a further count value from said receiving side, and a determiner for determining a said packet drop indicator on the basis of said count value output by said counter and said further count value received from said receiving side.

22. The control device of claim 19, further comprising a trigger message response element for determining said time period on the basis of trigger messages received successively by said sending side.

23. The control device of claim 19, provided within a communication apparatus of said sending side.

24. The control device of claim 19, provided within a monitoring agent associated with said sending side.

25. The control device of claim 19, wherein said sending side comprises an ingress node of a communication network.

26. The control device of claim 19, wherein said communication system is at least part of an Internet Protocol network with a Differentiated Services architecture.

27. A control device for a receiving side of a communication system comprising a sending side and said receiving side that are different sides connected via a transmission path, comprising: a counter for counting a number of packets received at the receiving side within a predetermined time period, and a count value handler for handling a count value determined by said counter in a procedure for determining a packet drop indicator; and a trigger message response element for determining said time period on the basis of trigger messages received successively by said receiving side.

28. The control device of claim 27, wherein said count value handler comprises a count value reporter for sending said count value to one or both of the sending side and a management unit.

29. The control device of claim 27, wherein said count value handler comprises a count value receiver for receiving a further count value from said sending side, and a determiner for determining a said packet drop indicator on the basis of said count value output by said counter and said further count value received from said sending side.

30. The control device of claim 27, further comprising a trigger message response element for determining said time period on the basis of trigger messages sent successively by said receiving side.

31. The control device of claim 27, provided within a communication apparatus of said receiving side.

32. The control device of claim 27, provided within a monitoring agent associated with said receiving side.

33. The control device of claim 27, wherein said receiving side comprises an egress node of a communication network.

* * * * *

UNITED STATES PATENT AND TRADEMARK OFFICE
CERTIFICATE OF CORRECTION

| | |
|---|---|
| PATENT NO. | : 8,009,582 B2 |
| APPLICATION NO. | : 12/532990 |
| DATED | : August 30, 2011 |
| INVENTOR(S) | : Mihaly et al. |

It is certified that error appears in the above-identified patent and that said Letters Patent is hereby corrected as shown below:

In Column 5, Line 62, delete "device" and insert -- device 20 --, therefor.

In Column 7, Lines 15-20, delete "Since the hardware......monitor apparatus." and insert the same as new paragraph.

In Column 7, Line 52, delete "or example," and insert -- For example, --, therefor.

In Column 11, Line 9, delete "of. PDI" and insert -- of PDI --, therefor.

In Column 18, Line 13, delete "dT(K)=(N~M)dT(N)," and insert -- dT(K)=(N–M)dT(N), --, therefor.

In Column 22, Line 59, in Claim 20, after "handler" delete "(25)".

Signed and Sealed this
Tenth Day of January, 2012

David J. Kappos
*Director of the United States Patent and Trademark Office*